US010475018B1

(12) United States Patent
Hitchcock et al.

(10) Patent No.: US 10,475,018 B1
(45) Date of Patent: Nov. 12, 2019

(54) UPDATING ACCOUNT DATA FOR MULTIPLE ACCOUNT PROVIDERS

(71) Applicant: Amazon Technologies, Inc., Reno, NV (US)

(72) Inventors: Daniel Wade Hitchcock, Bothell, WA (US); Brad Lee Campbell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 121 days.

(21) Appl. No.: 14/093,143

(22) Filed: Nov. 29, 2013

(51) Int. Cl.
*H04L 9/32* (2006.01)
*G06Q 20/22* (2012.01)
*G06Q 20/40* (2012.01)
*H04L 29/06* (2006.01)

(52) U.S. Cl.
CPC .......... *G06Q 20/227* (2013.01); *G06Q 20/40* (2013.01)

(58) Field of Classification Search
CPC ............ H04L 9/32; H04L 29/06; G06F 17/00
See application file for complete search history.

(56) References Cited

U.S. PATENT DOCUMENTS

| 5,199,590 | A | 4/1993 | Grandahl et al. |
| 5,991,882 | A | 11/1999 | Foley |
| 6,006,333 | A | 12/1999 | Nielsen |
| 6,097,259 | A | 8/2000 | Saito et al. |
| 6,115,643 | A | 9/2000 | Stine et al. |
| 6,144,988 | A | 11/2000 | Kappel |
| 6,182,131 | B1 | 1/2001 | Dean et al. |
| 6,182,229 | B1 | 1/2001 | Nielsen |
| 6,453,342 | B1 | 9/2002 | Himmel et al. |
| 6,607,322 | B2 | 8/2003 | Aruga et al. |
| 6,745,711 | B1 | 6/2004 | Martelli |
| 6,751,794 | B1 | 6/2004 | McCaleb et al. |
| 7,084,968 | B2 | 8/2006 | Shibuya et al. |
| 7,155,739 | B2 | 12/2006 | Bari et al. |
| 7,177,848 | B2 | 2/2007 | Hogan et al. |
| 7,185,364 | B2 | 2/2007 | Knouse et al. |
| 7,373,515 | B2 | 5/2008 | Owen et al. |

(Continued)

FOREIGN PATENT DOCUMENTS

| CN | 101286847 | 10/2008 |
| JP | H09179826 | 7/1997 |

(Continued)

OTHER PUBLICATIONS

U.S. Appl. No. 13/679,254, filed Nov. 16, 2012, and entitled "Mapping Stored Client Data to Requested Data Using Metadata".

(Continued)

*Primary Examiner* — Muriel S Tinkler
(74) *Attorney, Agent, or Firm* — Thomas | Horstemeyer, LLP

(57) ABSTRACT

Disclosed are various embodiments for updating account data with multiple account providers. Account management logic determines that personal information associated with a user has been updated. Multiple accounts of the user that may use the personal information are determined. The accounts are with multiple account providers. Corresponding account update requests for the accounts are sent to the account providers. The account update requests specify the personal information that has been updated.

21 Claims, 10 Drawing Sheets

(56) References Cited

U.S. PATENT DOCUMENTS

| | | |
|---|---|---|
| 7,428,750 B1 | 9/2008 | Dunn et al. |
| 7,441,263 B1 | 10/2008 | Bakshi et al. |
| 7,451,476 B1 | 11/2008 | Banks et al. |
| 7,512,875 B2 | 3/2009 | Davis |
| 7,607,164 B2 | 10/2009 | Vasishth et al. |
| 7,630,986 B1 | 12/2009 | Herz et al. |
| 7,631,346 B2 | 12/2009 | Hinton et al. |
| 7,634,811 B1 | 12/2009 | Kienzle et al. |
| 7,673,045 B1 | 3/2010 | Battle et al. |
| 7,685,298 B2 | 3/2010 | Day et al. |
| 7,698,170 B1 | 4/2010 | Darr et al. |
| 7,720,720 B1 | 5/2010 | Sharma et al. |
| 7,793,343 B2 | 9/2010 | Timmerman |
| 8,051,168 B1 | 11/2011 | Boysko et al. |
| 8,055,055 B2 | 11/2011 | Hamada et al. |
| 8,087,068 B1 | 12/2011 | Downey et al. |
| 8,151,328 B1 | 4/2012 | Lundy et al. |
| 8,166,161 B1 | 4/2012 | Gannu et al. |
| 8,200,975 B2 | 6/2012 | O'Connor |
| 8,201,217 B1 * | 6/2012 | Begen .............. H04L 63/0815 726/12 |
| 8,209,549 B1 | 6/2012 | Bain, III |
| 8,245,026 B1 | 8/2012 | Moore |
| 8,276,190 B1 | 9/2012 | Chang et al. |
| 8,327,428 B2 | 12/2012 | Bailey et al. |
| 8,423,467 B1 | 4/2013 | Johansson et al. |
| 8,453,198 B2 | 5/2013 | Band et al. |
| 8,468,577 B1 | 6/2013 | Pooley et al. |
| 8,510,811 B2 | 8/2013 | Kuang et al. |
| 8,544,072 B1 | 9/2013 | Masone et al. |
| 8,549,597 B1 | 10/2013 | Strand |
| 8,595,269 B2 | 11/2013 | Farcasiu et al. |
| 8,607,322 B2 | 12/2013 | Hinton et al. |
| 8,700,729 B2 | 4/2014 | Dua |
| 8,713,129 B2 | 4/2014 | Schneider |
| 8,721,738 B1 | 5/2014 | Miller |
| 8,745,705 B2 | 6/2014 | Hitchcock et al. |
| 8,745,711 B2 | 6/2014 | Matsuda |
| 8,751,794 B2 | 6/2014 | Haulund |
| 8,762,512 B1 | 6/2014 | Sundaram et al. |
| 8,769,305 B2 | 7/2014 | Blaisdell |
| 8,776,194 B2 | 7/2014 | Hitchcock et al. |
| 8,776,214 B1 | 7/2014 | Johansson |
| 8,789,135 B1 | 7/2014 | Pan |
| 8,812,666 B2 | 8/2014 | Kikinis |
| 8,819,795 B2 | 8/2014 | Hitchcock et al. |
| 8,819,810 B1 | 8/2014 | Liu |
| 8,819,851 B1 | 8/2014 | Johansson |
| 8,843,997 B1 | 9/2014 | Hare |
| 8,844,013 B2 | 9/2014 | Vangpat et al. |
| 8,863,250 B2 | 10/2014 | Hitchcock et al. |
| 8,918,848 B2 | 12/2014 | Sharma et al. |
| 8,955,065 B2 | 2/2015 | Hitchcock et al. |
| 9,053,307 B1 | 6/2015 | Johansson et al. |
| 9,055,055 B1 | 6/2015 | Strand et al. |
| 9,106,645 B1 | 8/2015 | Vadlamani |
| 9,225,704 B1 | 12/2015 | Johansson et al. |
| 9,282,098 B1 | 3/2016 | Hitchcock et al. |
| 9,330,198 B1 | 5/2016 | Campbell et al. |
| 9,369,460 B2 | 6/2016 | Johansson |
| 9,450,941 B2 | 9/2016 | Hitchcock et al. |
| 2002/0023059 A1 | 2/2002 | Bari et al. |
| 2002/0031230 A1 | 3/2002 | Sweet et al. |
| 2002/0049782 A1 | 4/2002 | Herzenberg et al. |
| 2002/0083012 A1 | 6/2002 | Bush et al. |
| 2002/0093915 A1 | 7/2002 | Larson |
| 2002/0108057 A1 | 8/2002 | Zhanhong et al. |
| 2002/0120757 A1 | 8/2002 | Sutherland et al. |
| 2002/0156757 A1 | 10/2002 | Brown |
| 2002/0178370 A1 | 11/2002 | Gurevich et al. |
| 2002/0191020 A1 | 12/2002 | Kaply et al. |
| 2003/0005299 A1 | 1/2003 | Xia et al. |
| 2003/0074580 A1 | 4/2003 | Knouse et al. |
| 2003/0135482 A1 | 7/2003 | Takahashi et al. |
| 2004/0036718 A1 | 2/2004 | Warren et al. |
| 2004/0119746 A1 | 6/2004 | Mizrah |
| 2005/0027713 A1 | 2/2005 | Cameron et al. |
| 2005/0149854 A1 | 7/2005 | Pennell et al. |
| 2005/0177731 A1 | 8/2005 | Torres et al. |
| 2005/0183003 A1 | 8/2005 | Peri |
| 2005/0188212 A1 | 8/2005 | Laferriere et al. |
| 2005/0210254 A1 | 9/2005 | Gabry et al. |
| 2005/0216768 A1 | 9/2005 | Eppert |
| 2005/0228899 A1 | 10/2005 | Wendkos et al. |
| 2006/0059434 A1 | 3/2006 | Boss et al. |
| 2006/0089837 A1 | 4/2006 | Adar et al. |
| 2006/0123472 A1 | 6/2006 | Schmidt et al. |
| 2006/0136985 A1 | 6/2006 | Ashley et al. |
| 2006/0165060 A1 | 7/2006 | Dua |
| 2006/0200424 A1 | 9/2006 | Cameron et al. |
| 2007/0003144 A1 | 1/2007 | Landstad et al. |
| 2007/0005964 A1 | 1/2007 | Grosse et al. |
| 2007/0023441 A1 | 2/2007 | Huffman et al. |
| 2007/0027715 A1 | 2/2007 | Gropper et al. |
| 2007/0044143 A1 | 2/2007 | Zhu et al. |
| 2007/0078785 A1 | 4/2007 | Bush et al. |
| 2007/0118394 A1 | 5/2007 | Cahoon |
| 2007/0130327 A1 | 6/2007 | Kuo et al. |
| 2007/0143827 A1 | 6/2007 | Nicodemus et al. |
| 2007/0234062 A1 | 10/2007 | Friedline |
| 2007/0234410 A1 | 10/2007 | Geller |
| 2007/0240226 A1 | 10/2007 | Song et al. |
| 2007/0250920 A1 | 10/2007 | Lindsay |
| 2008/0003144 A1 | 1/2008 | Cumberland et al. |
| 2008/0028444 A1 | 1/2008 | Loesch et al. |
| 2008/0031447 A1 | 2/2008 | Geshwind et al. |
| 2008/0040790 A1 | 2/2008 | Kuo |
| 2008/0052203 A1 | 2/2008 | Beyer et al. |
| 2008/0071808 A1 | 3/2008 | Hardt et al. |
| 2008/0120703 A1 | 5/2008 | Morris et al. |
| 2008/0120716 A1 | 5/2008 | Hall et al. |
| 2008/0141037 A1 | 6/2008 | Cheston et al. |
| 2008/0146194 A1 | 6/2008 | Yang et al. |
| 2008/0168539 A1 | 7/2008 | Stein |
| 2008/0201454 A1 | 8/2008 | Soffer |
| 2008/0201575 A1 | 8/2008 | Van |
| 2008/0201768 A1 | 8/2008 | Koo et al. |
| 2008/0256594 A1 | 10/2008 | Satish et al. |
| 2008/0263352 A1 | 10/2008 | Krahn et al. |
| 2009/0042540 A1 | 2/2009 | Bodnar et al. |
| 2009/0070412 A1 | 3/2009 | D Angelo et al. |
| 2009/0089883 A1 | 4/2009 | Martocci |
| 2009/0144546 A1 | 6/2009 | Jancula et al. |
| 2009/0150169 A1 | 6/2009 | Kirkwood et al. |
| 2009/0158406 A1 | 6/2009 | Jancula et al. |
| 2009/0240936 A1 | 9/2009 | Lambiase et al. |
| 2009/0259588 A1 | 10/2009 | Lindsay |
| 2009/0276839 A1 | 11/2009 | Peneder |
| 2009/0300196 A1 | 12/2009 | Haghpassand |
| 2010/0017616 A1 | 1/2010 | Nichols et al. |
| 2010/0037046 A1 | 2/2010 | Ferg et al. |
| 2010/0037303 A1 | 2/2010 | Sharif et al. |
| 2010/0071056 A1 | 3/2010 | Cheng et al. |
| 2010/0100721 A1 | 4/2010 | Su et al. |
| 2010/0100952 A1 | 4/2010 | Sample et al. |
| 2010/0106533 A1 | 4/2010 | Alvarez |
| 2010/0146609 A1 | 6/2010 | Bartlett |
| 2010/0154025 A1 | 6/2010 | Esteve et al. |
| 2010/0161965 A1 | 6/2010 | Solin et al. |
| 2010/0162373 A1 | 6/2010 | Springfield et al. |
| 2010/0178944 A1 | 7/2010 | Fodor |
| 2010/0178994 A1 | 7/2010 | Do et al. |
| 2010/0198698 A1 | 8/2010 | Raleigh et al. |
| 2010/0211796 A1 | 8/2010 | Gailey et al. |
| 2010/0217975 A1 | 8/2010 | Grajek et al. |
| 2010/0217997 A1 | 8/2010 | Chai et al. |
| 2010/0250330 A1 | 9/2010 | Lam et al. |
| 2010/0275024 A1 | 10/2010 | Abdulhayoglu |
| 2010/0313245 A1 | 12/2010 | Brandt et al. |
| 2011/0016515 A1 | 1/2011 | Dhanakshirur et al. |
| 2011/0055593 A1 | 3/2011 | Lurey et al. |
| 2011/0113245 A1 | 5/2011 | Varadarajan |
| 2011/0145049 A1 | 6/2011 | Hertel et al. |
| 2011/0145915 A1 | 6/2011 | Gnech et al. |

(56) References Cited

U.S. PATENT DOCUMENTS

| | | | |
|---|---|---|---|
| 2011/0162052 | A1 | 6/2011 | Hayward |
| 2011/0231651 | A1 | 9/2011 | Bollay |
| 2011/0265147 | A1 | 10/2011 | Liu |
| 2011/0277027 | A1 | 11/2011 | Hayton et al. |
| 2012/0011577 | A1 | 1/2012 | Mashimo |
| 2012/0036245 | A1 | 2/2012 | Dare et al. |
| 2012/0054095 | A1 | 3/2012 | Lesandro et al. |
| 2012/0072975 | A1 | 3/2012 | Labrador et al. |
| 2012/0084844 | A1 | 4/2012 | Brown et al. |
| 2012/0150888 | A1 | 6/2012 | Hyatt et al. |
| 2012/0158526 | A1 | 6/2012 | Cosman |
| 2012/0192256 | A1 | 7/2012 | Peterson et al. |
| 2012/0210443 | A1 | 8/2012 | Blaisdell et al. |
| 2012/0216260 | A1 | 8/2012 | Crawford et al. |
| 2012/0227094 | A1* | 9/2012 | Begen .............. G06F 21/41 726/4 |
| 2012/0291087 | A1 | 11/2012 | Agrawal |
| 2013/0007868 | A1 | 1/2013 | Hoggan et al. |
| 2013/0023818 | A1 | 1/2013 | Rosenblum et al. |
| 2013/0086657 | A1 | 4/2013 | Srinivasan et al. |
| 2013/0111543 | A1 | 5/2013 | Brown et al. |
| 2013/0167196 | A1 | 6/2013 | Spencer et al. |
| 2013/0198818 | A1 | 8/2013 | Hitchcock et al. |
| 2013/0198821 | A1 | 8/2013 | Hitchcock et al. |
| 2013/0198822 | A1 | 8/2013 | Hitchcock et al. |
| 2013/0198823 | A1 | 8/2013 | Hitchcock et al. |
| 2013/0198824 | A1 | 8/2013 | Hitchcock et al. |
| 2013/0205415 | A1 | 8/2013 | Roark et al. |
| 2013/0247147 | A1 | 9/2013 | Pontillo et al. |
| 2013/0283193 | A1 | 10/2013 | Griffin |
| 2013/0304616 | A1 | 11/2013 | Raleigh et al. |
| 2013/0318593 | A1 | 11/2013 | Smith et al. |
| 2013/0347078 | A1 | 12/2013 | Agarwal et al. |
| 2014/0089661 | A1 | 3/2014 | Mahadik et al. |
| 2014/0101437 | A1 | 4/2014 | Kube et al. |
| 2014/0259130 | A1 | 9/2014 | Li et al. |
| 2014/0310792 | A1 | 10/2014 | Hyland et al. |
| 2014/0325623 | A1 | 10/2014 | Johansson |
| 2015/0033302 | A1 | 1/2015 | Hitchcock et al. |
| 2015/0180852 | A1 | 6/2015 | Hitchcock et al. |
| 2015/0244714 | A1 | 8/2015 | Kundu et al. |
| 2016/0294837 | A1 | 10/2016 | Turgeman |

FOREIGN PATENT DOCUMENTS

| | | |
|---|---|---|
| JP | 2000347994 | 12/2000 |
| JP | 2002157226 | 5/2002 |
| JP | 2002169782 | 6/2002 |
| JP | 2005502931 | 1/2005 |
| JP | 2005346570 | 12/2005 |
| JP | 2007156698 | 6/2007 |
| JP | 2008197973 | 8/2008 |
| JP | 2008282388 | 11/2008 |
| JP | 2008287701 | 11/2008 |
| JP | 2009532772 | 9/2009 |
| JP | 2011505735 | 2/2011 |
| WO | 2011100331 | 8/2011 |
| WO | 2013116319 | 8/2013 |
| WO | 2013170374 | 11/2013 |

OTHER PUBLICATIONS

U.S. Patent Application entitled "Account Management for Multiple Network Sites" filed Feb. 1, 2012, having U.S. Appl. No. 13/363,654.

U.S. Patent Application entitled "Authentication Management Services" filed Feb. 1, 2012, having U.S. Appl. No. 13/363,664.

U.S. Patent Application entitled "Presenting Managed Security Credentials to Network Sites" filed Feb. 1, 2012, having U.S. Appl. No. 13/363,675.

U.S. Patent Application entitled "Recovery of Managed Security Credentials" filed Feb. 1, 2012, having U.S. Appl. No. 13/363,681.

U.S. Patent Application entitled "Logout From Multiple Network Sites" filed Feb. 1, 2012, having U.S. Appl. No. 13/363,685.

U.S. Patent Application entitled "Information Manager" filed Feb. 20, 2013, having U.S. Appl. No. 13/771,373.

U.S. Patent Application entitled "Proxy Server-Based Network Site Account Management" filed Mar. 11, 2013, having U.S. Appl. No. 13/792,678.

U.S. Appl. No. 13/925,283, entitled "Closed-Loop Stored Value Payment Instrument Brokerage," and filed Jun. 24, 2013.

"CNN Member Center Register Free" .COPYRGT. 2005 Cable News Network LP, LLLP. (1 page) http://web.archive.org/web/20051108050554/http://audience.cnn.com/service-s/cnn/memberservices/member.sub.—register.jsp?pid=&source=cnn&url=http%3A-%2F%2Faudience.cnn.com%2Fservices%2Fcnn%2Fmemberservices%2Fregwall%2Fmembe- r.sub.—profile.jsp%3Fsource%3Dcnn.

"Dria.org Blog archive: Firefox 3: Password management" Article published May 15, 2008 (4 pages) http://www.dria.org/wordpress/archives/2008/05/15/639/.

"KeePass Help Center: Password Generator" Article dated Jul. 30, 2008 as verified by the Internet Archive (4 pages) http://web.archive.org/web/20080730154305/http://keepass.info/help/base/p- wgenerator.html.

"KeePass Help Center: Security" Article dated Jul. 26, 2008 as verified by the Internet Archive (4 pages) http://web.archive.org/web/20080726082133/http://keepass.info/help/base/s- ecurity.html.

"KeePass Help Center: Technical FAQ" Article dated Aug. 6, 2008 as verified by the Internet Archive (6 pages) http://web.archive.org/web/20080806090217/http://keepass.info/help/base/f- aq.sub.—tech.html.

"KeePass Help Center: Using Stored Passwords" Article dated May 16, 2008 as verified by the Internet Archive (1 page) http://web.archive.org/web/20080516075550/http://www.keepass.info/help/ba- se/usingpws.html.

"LastPass Form Fill Demonstration" YouTube video uploaded Sep. 25, 2008 (2 pages) http://www.youtube.com/watch?v=bxz6jA8zuPA&feature=player.sub.—em- bedded.

"LastPass—Advanced Site Save and Autologin" YouTube video uploaded Jan. 6, 2009 (1 pages) http://www.youtube.com/watch?v=VCEBi25wadM.

"Mozilla.org: Using Privacy Features" .COPYRGT. 1999-2008 Mozilla.org (Apr. 28, 2008) (23 pages) http://www.mozilla.org/projects/security/pki/psm/help.sub.-21/using.sub.- —priv.sub.—help.html.

"MozillaZine: Security Error: Domain Name Mismatch or Server Certificate Expired" Article last modified Dec. 16, 2006 (observed by the Internet Archive on Jan. 10, 2007) (1 page) http://web.archive.org/web/20070110224337/http://kb.mozillazine.org/Secur- ity.sub.--Error%3A.sub.—Domain.sub.--Name.sub.—Mismatch.sub.—or.sub.--S- erver.sub.—Certificate.sub.--Expired.

Furnell, Steven. "An assessment of website password practices." Computers & Security 26.7 (2007): 445-451.

"RoboForm User Manual (Print Version)" .COPYRGT. 2000-2007 Siber Systems. (33 pages) http://web.archive.org/web/20071014183247/http://www.roboform.com/manual—pr.pdf.

"RoboForm: Does RoboForm work in My Browser: AOL, MSN, Mozilla, Firefox, Netscape, Avant, MaxThon, NetCaptor, Slim, etc" Article dated Feb. 9, 2008 as verified by the Internet Archive (5 pages) http://web.archive.org/web/20080209121716/http://www.roboform.com/browser- s.html#browser.sub.--mozilla.

"SSL Shopper: SSL Certificate Name Mismatch Error" Article posted Nov. 6, 2008 (observed by the Internet Archive on Dec. 10, 2008) (4 pages) http://web.archive.org/web/20081210144357/http://www.sslshopper.com/ssl-c- ertificate-name-mismatch-error.html.

"SuperGenPass: A Free Bookmarklet Password Generator Frequently Asked Questions" Article dated Jul. 16, 2008 as verified by the Internet Archive (7 pages) http://web.archive.org/web/20080716161432/http://supergenpass.com/about/.

"Yahoo! Mail Registration" .COPYRGT. 2005 Yahoo! Inc. [web page dated Sep. 20, 2005 by the Internet Archive] (2 pages) http://web.archive.org/web/20050920102232/http://edit.yahoo.com/config/ev- al.sub.—register?.intl=us&new=1&.done=&.src=ym&.v=0&.u=4sji0q8tcall6&.par- tner=&promo=&.last=.

(56) References Cited

OTHER PUBLICATIONS

"Yahoo! Sign-in and Registration Help: How do I change my password?" Dated Jan. 26, 2005 by the Internet Archive (1 page) http://web.archive.org/web/20050126025602/http://help.yahoo.com/help/us/e- dit/edit-13.html.
"Yahoo! Sign-in and Registration Help: How do I sign up?" Dated Jan. 26, 2005 by the Internet Archive (1 page) http://web.archive.org/web/20050126021347/http://help.yahoo.com/help/us/e- dit/edit-01.html.
Adam Pash. "Five Best Password Managers" Published Aug. 28, 2008 at lifehacker.com (.COPYRGT. 2008 Gawker Media Inc.) (3 pages) http://lifehacker.com/5042616/five-best-password-managers.
Adam Pash. "LastPass Autocompletes Logins and Forms in Chrome, iPhone" Published Jan. 20, 2009 at lifehacker.com (.COPYRGT. 2009 Gawker Media Inc.) (2 pages) http://lifehacker.com/5135416/lastpass-autocompletes-logins-and-forms-in--chrome-iphone.
Bagheera et al. "Effect of changing minimum password length": ars technica openforum http://arstechnica.com/civis/viewtopic.php?f=17&t=353096; 31 posts published by Oct. 21, 2005.
Canfora, G.; DiSanto, G.; Venturi, G.; Zimeo, E.; Zito, M.V. Proxy-based Hand-off of Web Sessions for User Mobility. The Second Annual Conference on MobiQuitous, 2005. Pub. Date: 2005. Relevant pp. 363-372. http://ieeexplore.ieee.org/stamp/stamp.jsp?tp=&arnumber=1541016.
Certificate. (n.d.) American Heritage® Dictionary of the English Language, Fifth Edition. (2011 ). Retrieved Sep. 29, 2016 from http://www. thefreedictionary .com/certificate.
Chad Perrin. "IT Security: Use the Firefox password manager" Published Aug. 4, 2009 by TechRepublic.com (4 pages) http://www.techrepublic.com/blog/security/use-the-firefox-password-manager/2089.
Diaz-Sanchez, Daniel; Almenarez, Florina; Marin, Andres; Arias, Patricia; Sanchez-Guerrero, Rosa; Sanvido, Fabio. A Privacy Aware Media Gateway for Connecting Private Multimedia Clouds to Limited Devices. 2011 4th Joint IFIP Wireless and Mobile Networking Conference (WMNC). http://ieeexplore.ieee.org/stamp/stamp.jsp?tp=&arnumber=6097259.
Digital certificate. (n.d.) Computer Literacy Basics: A Comprehensive Guide to IC3, Third Edition. (201 0). Course Technology Cengage Learning. ISBN-13: 978-1-4390-7853-2.
Exchange Server Forums "The SSL Certificate Server Name is incorrect" Forum posts from Aug. 24-25, 2005 (2 pages) http://forums.msexchange.org/m.sub.—160048900/mpage.sub.--1/key.sub.--/t- m.htm#160048900.
Jake Edge. "Firefox 3 SSL certificate warnings" Published Aug. 27, 2008 (8 pages) http://lwn.net/Articles/295810/.
Jammalamadaka, Ravi Chandra; van der Horst, Timothy W.; Mehrotra, Sharad; Seamons, Kent E.; Venkasubramanian Nalini. Delegate: A Proxy Based Architecture for Secure Web Access from an Untrusted Machine. 22nd Annual Computer Security Applications Conference, 2006. http://ieeexplore.ieee.org/stamp/stamp.jsp?arnumber=4041154.
Jana, Debasish; Bandyopadhyay, Debasis. Management of Identity and Credentials in Mobile Cloud Environment. 2013 International Conference on Advanced Computer Science and Information Systems (ICACSIS). http://ieeexplore.ieee.org/stamp/stamp.jsp?arnumber=6761561.
KeePass Features—Nov. 9, 2008 http://web.archive.org/web/20081109040244/http://keepass.info/features.ht- ml.
Kulvir Singh Bhogal. "Taking Firefox with You on the Road: Using a USB Thumb Drive" Published Jun. 2, 2006 (3 pages) http://www.informit.com/articles/printerfriendly.aspx?p=472692.
Macworld Mac OS X Hints—10.4: Create strong and memorable passwords—May 2, 2005 http://hints.macworld.com/article.php?story=20050323104042259.
Neuman, B. Clifford. Proxy-Based Authorization and Accounting for Distributed Systems. Proceedings, the 13th International Conference on Distributed Computing Systems. Pub. Date: 1993. Relevant pp. 283-291. http://ieeexplore.ieee.org/stamp/stamp.jsp?tp=&arnumber=287698.
Oppliger, Rolf; Rytz, Ruedi; Thomas Holderegger. Internet Banking: Client-Side Attacks and Protection Mechanisms. Computer, vol. 42, Issue: 6. Pub. Date: Aug. 2009. Relevant pp. 27-33. http://ieeexplore.ieee.org/stamp/stamp.jsp?tp=&arnumber=5199590.
Password Keychain 1.0.1.37—Mar. 28, 2006 http://www.softpedia.com/get/Security/Password-Managers-Generators/Passwo- rd-Keychain.shtml.
PC Magazine—LastPass 1.50 Review & Rating--Mar. 20, 2009 http://www.pcmag.com/article2/0,2817,2343562,00.asp#fbid=rg3fbOOKZ4v.
Sarah Perez. "Facebook 'Wins Worst API' in Developer Survey". TechCrunch. https://techcrunch.com/2011 /08/11 /facebookwins-worst-api-in-developer-survey/. Posted: Aug. 11, 2011. pp. 1-6.
Stack Overflow "why do we trust SSL certificates?" Various forum posts on Feb. 25, 2009 (4 pages) http://stackoverflow.com/questions/585129/why-do-we-trust-ssl-certificate- s.
Steve Gibson and Leo Laporte. "Security Now! Transcript of Episode #195: The SSL/TLS Protocol" Originally broadcast May 7, 2009 (22 pages) http://www.grc.com/sn/sn-195.pdf.
T. Dierks et al. "RFC 2246: The TLS Protocol Version 1.0" . COPYRGT. 1999 The Internet Society. (80 pages) http://www.rfc-editor.org/rfc/pdfrfc/rfc2246.txt.pdf.
Watt, John; Sinnott, Richard 0.; Inman, George; Chadwick, David. Federated Authentication and Authorisation in the Social Science Domain. 2011 Sixth International Conference on Availability, Reliability and Security (ARES). Relevant pp. 541-548. http://ieeexplore.ieee.org/stamp/stamp.jsp?tp=&arnumber=6045974&tag=1.
Wikipedia article for "Password manager" Originally published Jul. 31, 2008 (2 pages) http://en.wikipedia.org/w/index.php?title=Password.sub.—manager&oldid=22- 9103460.
Bin Mat Nor, Fazli; Abd Jalil, Kamarularifin; Ab Manan, Jamalul-lail. An Enhanced Remote Authentication Scheme to Mitigate Man-In-The-Browser Attacks. 2012 International Conference on Cyber Security, Cyber Warfare and Digital orensic (CyberSec). http://ieeexplore.ieee.org/stamp/stamp.jsp?arnumber=6246086.
Haidar, A.N.; Zasada, S.J.; Coveney, P.V.; Abdallah, A. E.; Beckles, B. Audited Credential Delegation—A User-Centric Identity Management Solution for Computational Grid Environments. 2010 Sixth International Conference on Information Assurance and Security (IAS). http://ieeexplore.ieee.org/stamp/stamp.jsp?arnumber=5604067.
PCT Patent Application PCT/US2013/023818 filed on Jan. 30, 2013, International Search Report and Written Opinion dated Apr. 11, 0213.
Canadian Patent Application CA 2,861,384 filed on Jan. 30, 2013, First Office Action dated Apr. 9, 2015.
Canadian Patent Application CA 2,861,384 filed on Jan. 30, 2013, Second Office Action dated May 5, 2016.
Canadian Patent Application CA 2,861,384 filed on Jan. 30, 2013, Notice of Allowance dated Apr. 13, 2017.
"P-Synch Installation and Administration Guide" Last updated Jun. 1, 2000. .COPYRGT. 2000 M-Tech Inc. (385 pages).
Canadian Patent Application CA 2,861,384 filed on Jan. 30, 2013, Notice of Patent dated Oct. 31, 2017.
Chinese Patent Application CN201380018421.0 filed on Jan. 30, 2013, First Office Action dated Jul. 19, 2016.
Chinese Patent Application CN201380018421.0 filed on Jan. 30, 2013, Second Office Action dated Jan. 22, 2017.
Chinese Patent Application CN201380018421.0 filed on Jan. 30, 2013, Third Office Action dated May 24, 2017.
Chinese Patent Application CN201380018421.0 filed on Jan. 30, 2013, Notice of Allowance dated Aug. 3, 2017.
Chinese Patent Application CN201380018421.0 filed on Jan. 30, 2013, Notice of Patent dated Nov. 14, 2017.
Japanese Patent Application JP 2014-555667 filed on Jan. 30, 2013, First Office Action dated Sep. 8, 2015.
Japanese Patent Application JP 2014-555667 filed on Jan. 30, 2013, Second Office Action dated Apr. 19, 2016.
Japanese Patent Application JP 2014-555667 filed on Jan. 30, 2013, Notice of Allowance dated Aug. 16, 2016.
Japanese Patent Application JP 2014-555667 filed on Jan. 30, 2013, Notice of Patent dated Sep. 23, 2016.

(56) References Cited

OTHER PUBLICATIONS

European Patent Application EP 13743243.1 filed on Jan. 30, 2013, Office Action dated Sep. 9, 2015.
European Patent Application EP 13743243.1 filed on Jan. 30, 2013, Notice of Allowance dated Mar. 23, 2018.
Japanese Patent Application JA 2016-180124 filed on Jan. 30, 2013, Office Action dated Oct. 12, 2017.
Japanese Patent Application JA 2016-180125 filed on Jan. 30, 2013, Office Action dated Sep. 12, 2017.
Japanese Patent Application JA 2016-180126 filed on Jan. 30, 2013, Office Action dated Sep. 12, 2017.
Japanese Patent Application JA 2016-180127 filed on Jan. 30, 2013, Office Action dated Sep. 12, 2017.
Japanese Patent Application JA 2016-180128 filed on Jan. 30, 2013, Office Action dated Sep. 5, 2017.
Japanese Patent Application JA 2016-180128 filed on Jan. 30, 2013, Notice of Allowance dated Jan. 9, 2018.
Japanese Patent Application JA 2016-180128 filed on Jan. 30, 2013, Notice of Patent dated Mar. 4, 2018.
Canadian Patent Application CA 2,974,536 filed on Jan. 30, 2013, Notice of Allowance dated Oct. 20, 2017.
Chinese Patent Application CN 201710968939.0 filed on Jan. 30, 2013, Notice of Allowance dated Feb. 14, 2018.
U.S. Appl. No. 12/539,886, filed Aug. 12, 2009, Non-Final Office Action dated Jun. 11, 2012.
U.S. Appl. No. 12/539,886, filed Aug. 12, 2009, Response to Non-Final Office Action dated Jun. 11, 2012.
U.S. Appl. No. 12/539,886, filed Aug. 12, 2009, Final Office Action dated Dec. 31, 2012.
U.S. Appl. No. 12/539,886, filed Aug. 12, 2009, Response to Final Office Action dated Dec. 31, 2012.
U.S. Appl. No. 12/539,886, filed Aug. 12, 2009, Advisory Action dated Apr. 18, 2013.
U.S. Appl. No. 12/539,886, filed Aug. 12, 2009, Non-Final Office Action dated Jul. 26, 2013.
U.S. Appl. No. 12/539,886, filed Aug. 12, 2009, Response to Non-Final Office Action dated Jul. 26, 2013.
U.S. Appl. No. 12/539,886, filed Aug. 12, 2009, Response to Advisory Action dated Apr. 18, 2013.
U.S. Appl. No. 12/539,886, filed Aug. 12, 2009, Notice of Allowance dated Feb. 24, 2014.
U.S. Appl. No. 14/323,779, filed Jul. 3, 2014, Non-Final Office Action dated Mar. 4, 2015.
U.S. Appl. No. 14/323,779, filed Jul. 3, 2014, Response to Non-Final Office Action dated Mar. 4, 2015.
U.S. Appl. No. 14/323,779, filed Jul. 3, 2014, Final Office Action dated Oct. 5, 2015.
U.S. Appl. No. 14/323,779, filed Jul. 3, 2014, Response to Final Office Action dated Oct. 5, 2015.
U.S. Appl. No. 14/323,779, filed Jul. 3, 2014, Notice of Allowance dated Feb. 17, 2016.
U.S. Appl. No. 15/172,750, filed Jun. 3, 2016, Non-Final Office Action dated May 3, 2018.
U.S. Appl. No. 13/194,287, filed Jul. 29, 2011, Notice of Allowance dated May 18, 2017.
U.S. Appl. No. 13/194,287, filed Jul. 29, 2011, Response to Final Office Action dated Oct. 20, 2016.
U.S. Appl. No. 13/194,287, filed Jul. 29, 2011, Final Office Action dated Oct. 20, 2016.
U.S. Appl. No. 13/194,287, filed Jul. 29, 2011, Response to Non-Final Office Action dated Apr. 8, 2016.
U.S. Appl. No. 13/194,287, filed Jul. 29, 2011, Non-Final Office Action dated Apr. 8, 2016.
U.S. Appl. No. 13/194,287, filed Jul. 29, 2011, Response to Final Office Action dated Jan. 27, 2014.
U.S. Appl. No. 13/194,287, filed Jul. 29, 2011, Final Office Action dated Jan. 27, 2014.
U.S. Appl. No. 13/194,287, filed Jul. 29, 2011, Response to Non-Final Office Action dated Jul. 3, 2013.
U.S. Appl. No. 13/194,287, filed Jul. 29, 2011, Non-Final Office Action dated Jul. 3, 2013.
U.S. Appl. No. 13/194,287, filed Jul. 29, 2011, Response to Non-Final Office Action dated Dec. 5, 2012.
U.S. Appl. No. 13/194,287, filed Jul. 29, 2011, Non-Final Office Action dated Dec. 5, 2012.
U.S. Appl. No. 14/630,219, filed Feb. 24, 2015, Non-Final Office Action dated Jan. 25, 2016.
U.S. Appl. No. 14/630,219, filed Feb. 24, 2015, Response to Non-Final Office Action dated Jan. 25, 2016.
U.S. Appl. No. 14/630,219, filed Feb. 24, 2015, Final Office Action dated May 10, 2016.
U.S. Appl. No. 14/630,219, filed Feb. 24, 2015, Patent Board of Appeals Decision dated Jul. 5, 2016.
U.S. Appl. No. 14/630,219, filed Feb. 24, 2015, Examiners Answer dated Oct. 13, 2016.
U.S. Appl. No. 13/363,681, filed Feb. 1, 2012, Non-Final Office Action dated Apr. 15, 2013.
U.S. Appl. No. 13/363,681, filed Feb. 1, 2012, Response to Non-Final Office Action dated Apr. 15, 2013.
U.S. Appl. No. 13/363,681, filed Feb. 1, 2012, Final Office Action dated Nov. 8, 2013.
U.S. Appl. No. 13/363,681, filed Feb. 1, 2012, Response to Final Office Action dated Nov. 8, 2013.
U.S. Appl. No. 13/363,681, filed Feb. 1, 2012, Advisory Action dated Feb. 28, 2014.
U.S. Appl. No. 13/363,681, filed Feb. 1, 2012, Non-Final Office Action dated May 20, 2014.
U.S. Appl. No. 13/363,681, filed Feb. 1, 2012, Response to Non-Final Office Action dated May 20, 2014.
U.S. Appl. No. 13/363,681, filed Feb. 1, 2012, Notice of Allowance dated Oct. 1, 2014.
U.S. Appl. No. 14/615,931, filed Feb. 6, 2015, Non-Final Office Action dated Jul. 17, 2015.
U.S. Appl. No. 14/615,931, filed Feb. 6, 2015, Response to Non-Final Office Action dated Jul. 17, 2015.
U.S. Appl. No. 14/615,931, filed Feb. 6, 2015, Final Office Action dated Dec. 11, 2015.
U.S. Appl. No. 14/615,931, filed Feb. 6, 2015, Response to Final Office Action dated Dec. 11, 2015.
U.S. Appl. No. 14/615,931, filed Feb. 6, 2015, Notice of Allowance dated May 20, 2016.
U.S. Appl. No. 15/239,475, filed Aug. 17, 2016, Notice of Allowance dated Feb. 2, 2017.
U.S. Appl. No. 13/363,685, filed Feb. 1, 2012, Non-Final Office Action dated Jan. 22, 2013.
U.S. Appl. No. 13/363,685, filed Feb. 1, 2012, Response to Non-Final Office Action dated Jan. 22, 2013.
U.S. Appl. No. 13/363,685, filed Feb. 1, 2012, Non-Final Office Action dated Jul. 3, 2013.
U.S. Appl. No. 13/363,685, filed Feb. 1, 2012, Response to Non-Final Office Action dated Jul. 3, 2013.
U.S. Appl. No. 13/363,685, filed Feb. 1, 2012, Non-Final Office Action dated Feb. 3, 2014.
U.S. Appl. No. 13/363,685, filed Feb. 1, 2012, Response to Non-Final Office Action dated Feb. 3, 2014.
U.S. Appl. No. 13/363,685, filed Feb. 1, 2012, Notice of Allowance dated Jun. 3, 2014.
U.S. Appl. No. 14/512,541, filed Oct. 13, 2014, Restriction/Election dated May 19, 2016.
U.S. Appl. No. 14/512,541, filed Oct. 13, 2014, Response to Restriction/Election dated May 19, 2016.
U.S. Appl. No. 14/512,541, filed Oct. 13, 2014, Non-Final Office Action dated Aug. 4, 2016.
U.S. Appl. No. 14/512,541, filed Oct. 13, 2014, Response to Non-Final Office Action dated Aug. 4, 2016.
U.S. Appl. No. 14/512,541, filed Oct. 13, 2014, Final Office Action dated Nov. 9, 2016.
U.S. Appl. No. 14/512,541, filed Oct. 13, 2014, Response to Final Office Action dated Nov. 9, 2016.
U.S. Appl. No. 14/512,541, filed Oct. 13, 2014, Notice of Allowance dated Feb. 23, 2017.

(56) References Cited

OTHER PUBLICATIONS

U.S. Appl. No. 13/679,254, filed Nov. 16, 2012, Non-Final Office Action dated May 23, 2014.
U.S. Appl. No. 13/679,254, filed Nov. 16, 2012, Response to Non-Final Office Action dated May 23, 2014.
U.S. Appl. No. 13/679,254, filed Nov. 16, 2012, Non-Final Office Action dated Dec. 22, 2014.
U.S. Appl. No. 13/679,254, filed Nov. 16, 2012, Response to Non-Final Office Action dated Dec. 22, 2014.
U.S. Appl. No. 13/679,254, filed Nov. 16, 2012, Final Office Action dated Jul. 17, 2015.
U.S. Appl. No. 13/679,254, filed Nov. 16, 2012, Response to Final Office Action dated Jul. 17, 2015.
U.S. Appl. No. 13/679,254, filed Nov. 16, 2012, Notice of Allowance dated Jan. 6, 2016.
U.S. Appl. No. 15/097,704, filed Apr. 13, 2016, Non-Final Office Action dated Mar. 24, 2017.
U.S. Appl. No. 15/097,704, filed Apr. 13, 2016, Response to Non-Final Office Action dated Mar. 24, 2017.
U.S. Appl. No. 15/097,704, filed Apr. 13, 2016, Final Office Action dated Oct. 6, 2017.
U.S. Appl. No. 13/792,678, filed Mar. 11, 2013, Non-Final Office Action dated Nov. 6, 2014.
U.S. Appl. No. 13/792,678, filed Mar. 11, 2013, Response to Non-Final Office Action dated Nov. 6, 2014.
U.S. Appl. No. 13/792,678, filed Mar. 11, 2013, Non-Final Office Action dated Jun. 3, 2015.
U.S. Appl. No. 13/792,678, filed Mar. 11, 2013, Response to Non-Final Office Action dated Jun. 3, 2015.
U.S. Appl. No. 13/792,678, filed Mar. 11, 2013, Notice of Allowance dated Nov. 9, 2015.
U.S. Appl. No. 15/044,709, filed Feb. 16, 2016, Non-Final Office Action dated Oct. 7, 2016.
U.S. Appl. No. 15/044,709, filed Feb. 16, 2016, Response to Non-Final Office Action dated Oct. 7, 2016.
U.S. Appl. No. 15/044,709, filed Feb. 16, 2016, Notice of Allowance dated Feb. 7, 2017.
U.S. Appl. No. 14/037,108, filed Sep. 25, 2013, Non-Final Office Action dated Feb. 1, 2016.
U.S. Appl. No. 14/037,108, filed Sep. 25, 2013, Response to Non-Final Office Action dated Feb. 1, 2016.
U.S. Appl. No. 14/037,108, filed Sep. 25, 2013, Final Office Action dated Jul. 8, 2016.
U.S. Appl. No. 14/037,108, filed Sep. 25, 2013, Response to Final Office Action dated Jul. 8, 2016.
U.S. Appl. No. 14/037,108, filed Sep. 25, 2013, Non-Final Office Action dated Mar. 9, 2017.
U.S. Appl. No. 14/037,108, filed Sep. 25, 2013, Response to Non-Final Office Action dated Mar. 9, 2017.
U.S. Appl. No. 14/037,108, filed Sep. 25, 2013, Notice of Allowance dated Aug. 23, 2017.
U.S. Appl. No. 13/917,138, filed Jun. 13, 2013, Non-Final Office Action dated Dec. 18, 2014.
U.S. Appl. No. 13/917,138, filed Jun. 13, 2013, Response to Non-Final Office Action dated Dec. 18, 2014.
U.S. Appl. No. 13/917,138, filed Jun. 13, 2013, Final Office Action dated Apr. 6, 2015.
U.S. Appl. No. 13/917,138, filed Jun. 13, 2013, Response to Final Office Action dated Apr. 6, 2015.
U.S. Appl. No. 13/917,138, filed Jun. 13, 2013, Notice of Allowance dated Nov. 30, 2015.
U.S. Appl. No. 13/917,143, filed Jun. 13, 2013, Non-Final Office Action dated Nov. 10, 2014.
U.S. Appl. No. 13/917,143, filed Jun. 13, 2013, Final Office Action dated May 27, 2015.
U.S. Appl. No. 13/917,143, filed Jun. 13, 2013, Non-Final Office Action dated Nov. 19, 2015.
U.S. Appl. No. 13/917,143, filed Jun. 13, 2013, Final Office Action dated Jun. 3, 2016.
U.S. Appl. No. 13/917,143, filed Jun. 13, 2013, Response to Non-Final Office Action dated Nov. 10, 2014.
U.S. Appl. No. 13/917,143, filed Jun. 13, 2013, Response to Final Office Action dated May 27, 2015.
U.S. Appl. No. 13/917,143, filed Jun. 13, 2013, Response to Non-Final Office Action dated Nov. 19, 2015.
U.S. Appl. No. 13/917,143, filed Jun. 13, 2013, Patent Board of Appeals Decision dated Oct. 13, 2016.
U.S. Appl. No. 13/917,143, filed Jun. 13, 2013, Notice of Allowance dated Nov. 9, 2016.
U.S. Appl. No. 15/445,054, filed Feb. 28, 2017, Non-Final Office Action dated Oct. 20, 2017.
U.S. Appl. No. 15/445,054, filed Feb. 28, 2017, Response to Non-Final Office Action dated Oct. 20, 2017.
U.S. Appl. No. 13/363,654, filed Feb. 1, 2012, Non-Final Office Action dated Apr. 1, 2013.
U.S. Appl. No. 13/363,654, filed Feb. 1, 2012, Response to Non-Final Office Action dated Apr. 1, 2013.
U.S. Appl. No. 13/363,654, filed Feb. 1, 2012, Final Office Action dated Sep. 12, 2013.
U.S. Appl. No. 13/363,654, filed Feb. 1, 2012, Response to Final Office Action dated Sep. 12, 2013.
U.S. Appl. No. 13/363,654, filed Feb. 1, 2012, Notice of Allowance dated Dec. 13, 2013.
U.S. Appl. No. 13/363,664, filed Feb. 1, 2012, Non-Final Office Action dated May 9, 2013.
U.S. Appl. No. 13/363,664, filed Feb. 1, 2012, Response to Non-Final Office Action dated May 9, 2013.
U.S. Appl. No. 13/363,664, filed Feb. 1, 2012, Final Office Action dated Nov. 26, 2013.
U.S. Appl. No. 13/363,664, filed Feb. 1, 2012, Response to Final Office Action dated Nov. 26, 2013.
U.S. Appl. No. 13/363,664, filed Feb. 1, 2012, Notice of Allowance dated Mar. 17, 2014.
U.S. Appl. No. 13/363,675, filed Feb. 1, 2012, Non-Final Office Action dated May 9, 2013.
U.S. Appl. No. 13/363,675, filed Feb. 1, 2012, Response to Non-Final Office Action dated May 9, 2013.
U.S. Appl. No. 13/363,675, filed Feb. 1, 2012, Final Office Action dated Oct. 9, 2013.
U.S. Appl. No. 13/363,675, filed Feb. 1, 2012, Response to Final Office Action dated Oct. 9, 2013.
U.S. Appl. No. 13/363,675, filed Feb. 1, 2012, Notice of Allowance dated Jun. 13, 2014.
Chinese Patent Application 201710968939.0 filed on Jan. 30, 2019, Notice of Allowance dated Jan. 22, 2019.
India Patent Application 5781/DELNP/2014 filed on Jan. 30, 2013, 1st Examination Report dated Jan. 31, 2019.
U.S. Appl. No. 15/172,750, filed Jun. 3, 2016, Notice of Patent Decision dated Mar. 19, 2019.
U.S. Appl. No. 15/628,303, filed Jun. 20, 2017, Non-Final Office Action dated Mar. 21, 2019.
U.S. Appl. No. 15/679,205, filed Aug. 17, 2017, Notice of Allowance dated Mar. 14, 2019.

* cited by examiner

UPDATING ACCOUNT DATA FOR MULTIPLE ACCOUNT PROVIDERS

BACKGROUND

Individuals may have user accounts for numerous online services. For example, an individual may have several user accounts for online merchants, user accounts for daily deals sites, user accounts for banking, user accounts for social networking, and so on. In order to create such accounts, the individual may have to specify various personal information, such as, for example, full name, shipping address, billing address, email account, telephone number, date of birth, payment instruments, and/or other personal information. When information changes, a user may have to visit separate network sites for each account in order to update the information manually.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to updating account data for multiple account providers. Personal information that a user provides to an account provider may change from time to time. For example, a user may move from one physical address to another. Although the user may provide the same physical address for multiple accounts with multiple account providers, the user typically has to log in manually with each account provider and use differing processes in order to update the address for the respective account provider. Such procedures are burdensome, and users are likely to delay updating information until absolutely necessary. In some cases, the users may forget that a particular account exists or may forget a password required to update the particular account. The resulting mismatch between the out-of-date stored account data of the account provider and the current information may lead to communication failure, payment failure, fraud, and/or other problems.

Various embodiments of the present disclosure facilitate automatic updates of account data for multiple account providers. Rather than manually logging into network sites for each account provider and utilizing a different update procedure for each account provider, account management logic that manages the security credentials for each account is configured to communicate with each account provider automatically and provide the updated account information. In various embodiments, the account management logic may be embodied within the user's client device, within a proxy server or other intermediate network device, or within a server that performs the account management functions.

Figure 1:
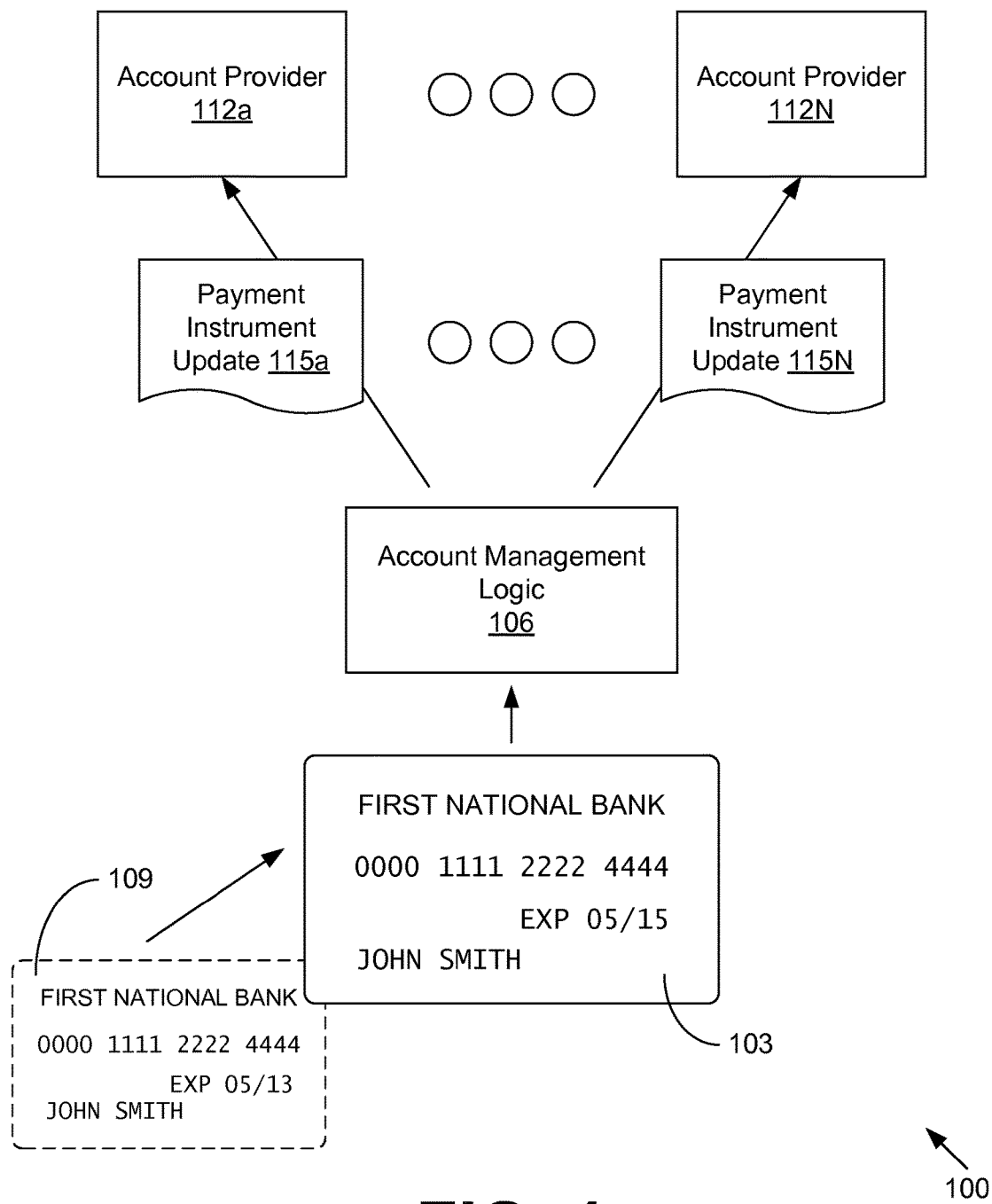
FIG. 1 is a drawing depicting one example scenario involving account updates in accordance with various embodiments of the present disclosure.

Turning now to FIG. 1, shown is one example scenario 100 involving account updates in accordance with various embodiments of the present disclosure. In the example scenario 100, a user has provided an updated credit card 103 to the account management logic 106. The updated credit card 103 is an updated version of a previous credit card 109 that had been provided to a plurality of account providers 112a . . . 112N. In this example, the updated credit card 103 is the same as the previous credit card 109 except that the expiration date has been updated. Notwithstanding the minor difference, the previous credit card 109 may be rendered unusable by the account providers 112 when the original expiration date has passed. Thus, it is important to ensure that the account providers 112 have the information from the updated credit card 103, especially if the account providers 112 are configured for automatic pay or other recurring payment arrangements using the previous credit card 109.

The account management logic 106 determines that an updated credit card 103 has been provided and proceeds to propagate the updated credit card 103 to the account providers 112 that are configured to use the previous credit card 109. For example, the account management logic 106 may issue individual payment instrument updates 115a . . . 115N for the respective account providers 112. The account providers 112 receive the payment instrument updates 115 and proceed to update their internal systems to reflect the updated credit card 103 being associated with the corresponding user accounts. In the following discussion, a general description of the system and its components is provided, followed by a discussion of the operation of the same.

Figure 2A:
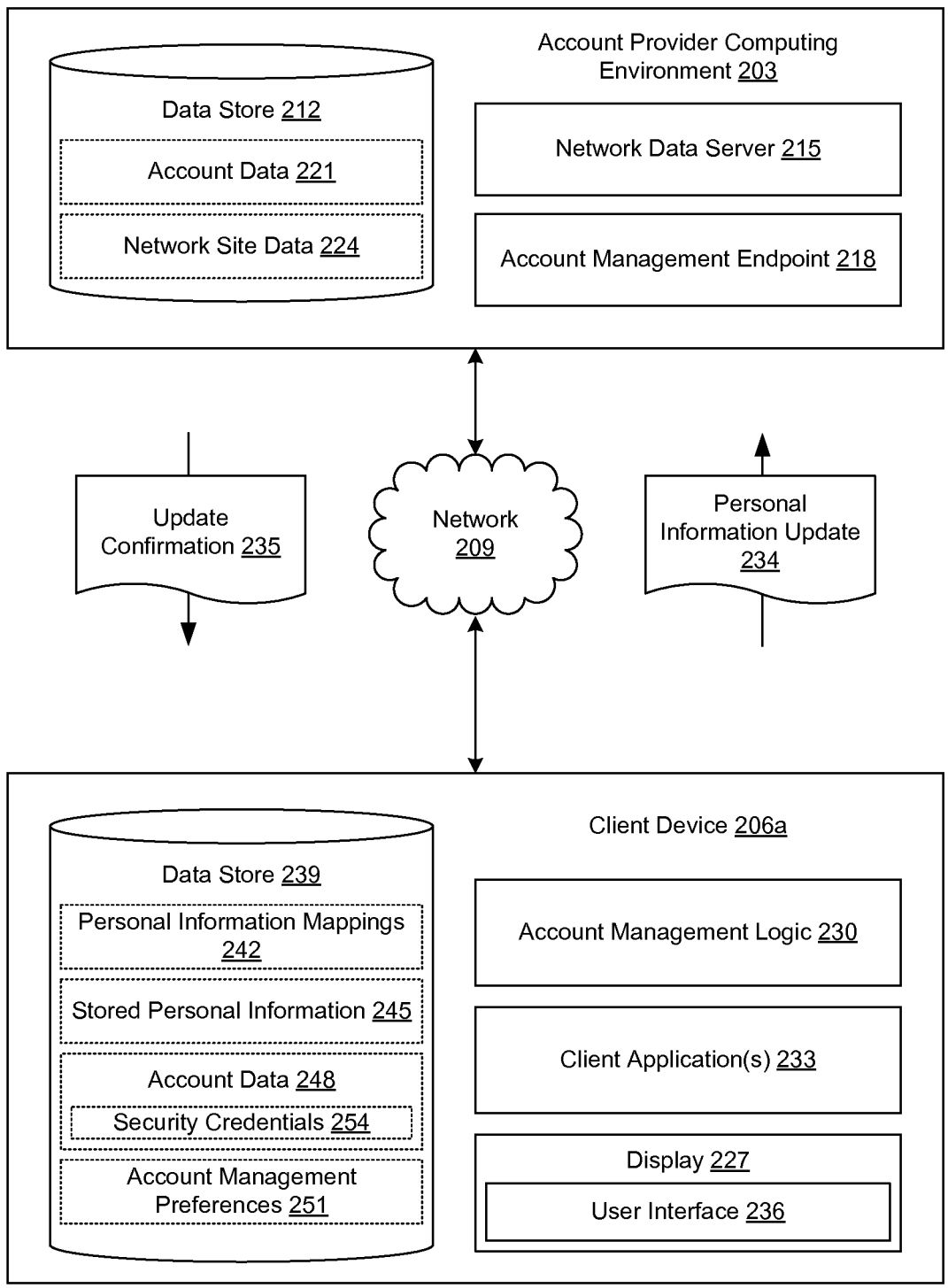
FIGS. 2A-2C are schematic block diagrams of networked environments according to various embodiments of the present disclosure.

With reference to FIG. 2A, shown is a networked environment 200a according to various embodiments. The networked environment 200a includes an account provider computing environment 203 and a client device 206a in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The account provider computing environment 203 may comprise, for example, a server computer or any other system providing computing capability. Alternatively, the account provider computing environment 203 may employ a plurality of computing devices that may be arranged, for example, in one or more server banks or computer banks or other arrangements. Such computing devices may be located in a single installation or may be distributed among many different geographical locations. For example, the account provider computing environment 203 may include a plurality of computing devices that together may comprise a hosted computing resource, a grid computing resource, and/or any other distributed computing arrangement. In some cases, the account provider computing environment 203 may correspond to an elastic computing resource where the allotted capacity of processing, network, storage, or other computing-related resources may vary over time.

Various applications and/or other functionality may be executed in the account provider computing environment 203 according to various embodiments. Also, various data is stored in a data store 212 that is accessible to the account provider computing environment 203. The data store 212 may be representative of a plurality of data stores 212 as can be appreciated. The data stored in the data store 212, for example, is associated with the operation of the various applications and/or functional entities described below.

The components executed on the account provider computing environment 203, for example, include a network data server 215, an account management endpoint 218, and other applications, services, processes, systems, engines, or functionality not discussed in detail herein. The network data server 215 is executed to serve up resources of a network site, which may include network pages, mobile application data, and/or other forms of network content. The network data server 215 may comprise a commercially available hypertext transfer protocol (HTTP) server such as Apache® HTTP Server, Apache® Tomcat®, Microsoft® Internet Information Services (IIS), or other servers. The network data server 215 may serve up network content via HTTP, simple object access protocol (SOAP), representational state transfer (REST), real-time transfer protocol (RTP), or other protocols. Some or all resources of the network site may be protected from anonymous access. That is to say, the network data server 215 may require authentication of a user account before granting access to resources. Authentication may be performed by way of a web services application programming interface (API) endpoint, one or more forms in network pages, and/or other approaches.

The account management endpoint 218 is an exposed endpoint configured to facilitate account management functions such as account creation, account modification, and so on. The account management endpoint 218 may utilize a web services API, one or more forms in network pages, and/or other approaches to communication. The account management endpoint 218 may be provided by the network data server 215 or may be a separate entity within the account provider computing environment 203.

The data stored in the data store 212 includes, for example, account data 221, network site data 224, and potentially other data. The account data 221 may include various data associated with user accounts, including security credentials, personal information, and/or other data. The network site data 224 corresponds to data that may be used by the network data server 215 in serving up network site content. Such network site data 224 may include, for example, hypertext markup language (HTML), extensible markup language (XML), cascading style sheets (CSS), templates, text, images, audio, video, animations, and/or other data.

The client device 206a is representative of a plurality of client devices that may be coupled to the network 209. The client device 206a may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206a may include a display 227. The display 227 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206a may be configured to execute various applications or other executable logic such as account management logic 230, a client application 233, and/or other applications. The account management logic 230 is executed to facilitate updating account data for multiple accounts associated with multiple account providers. To this end, the account management logic 230 is configured to send personal information updates 234 to the account management endpoint 218 via the network 209 and receive update confirmations 235 from the account management endpoint 218 via the network 209. Additionally, the account management logic 230 may be configured to manage usernames, passwords, and/or other information used for the client application 233 to log into the user account so as to access protected resources served up by the network data server 215.

The client application 233 may be executed in a client device 206a for example, to access network content served up by the account provider computing environment 203 and/or other servers, thereby rendering a user interface 236 on the display 227. To this end, the client application 233 may comprise, for example, a browser, a dedicated application, etc., and the user interface 236 may comprise a network page, an application screen, etc. The account management logic 230 may also render user interfaces 236 upon the display 227. In one embodiment, where the client application 233 is a browser, the account management logic 230 may correspond to a plug-in for the browser. Alternatively, the account management logic 230 may be a standalone application, which may be in communication with the client application 233 via a form of inter-process communication. The client device 206a may be configured to execute applications beyond the client application 233 such as, for example, email applications, social networking applications, word processors, spreadsheets, and/or other applications.

Also, various data is stored in a data store 239 that is accessible to the client device 206a. The data store 239 may be representative of a plurality of data stores 239 as can be appreciated. The data stored in the data store 239, for example, is associated with the operation of the various applications and/or functional entities of the client device 206a. For example, the data store 239 may include personal information mappings 242, stored personal information 245, account data 248, account management preferences 251, and/or other data.

The personal information mappings 242 may comprise data that maps stored personal information 245 to requirements of account providers. The stored personal information 245 may include data such as, for example, names, profile pictures, email addresses, telephone numbers, fax numbers, addresses, credit card or other payment instrument information, and so on. In some embodiments, personal information may be defined as any user-specific information, excluding security credentials.

The personal information mappings 242 may indicate that one or more items of stored personal information 245 are to be provided to an account provider to satisfy a requirement for a certain type of personal information. Moreover, the personal information mappings 242 may define a transformation of the stored personal information 245 to a format that is to be accepted by an account provider. As a non-limiting example, a personal information mapping 242 may indicate that a first name and a last name from the stored personal information 245 are to be concatenated with a single space between them and be transformed to upper case in order to be supplied to an account provider as a "full name" required for a certain account with the account provider.

Metadata including a mapping of data fields as in the personal information mappings 242 may be obtained from the account provider computing environment 203, or from the account management logic 230, and employed according to the principles described in U.S. patent application Ser. No. 13/679,254 filed on Nov. 16, 2012, and entitled "MAPPING STORED CLIENT DATA TO REQUESTED DATA USING METADATA," which is incorporated by reference in its entirety.

The account data 248 may comprise various data associated with accounts of a user. For example, the account data 248 may include security credentials 254 such as usernames, passwords, security keys, tokens, answers to knowledge-based questions, and/or other credentials. The account data 248 may include security credential specifications (e.g., minimum password length, required use of certain characters, etc.), metadata describing how to access authentication endpoints and/or account management endpoints 218, stored personal information 245 that has been transformed according to personal information mappings 242, and/or other data. The account management preferences 251 may define user preferences on how personal information is to be updated, whether updates are to happen periodically and/or automatically, whether updates are to be automatically made for certain accounts but not others, and/or other types of preferences.

The account data 248 and/or the stored personal information 245 may be created, managed, and used by various embodiments as described in U.S. Patent Application entitled "ACCOUNT MANAGEMENT FOR MULTIPLE NETWORK SITES" filed on Feb. 1, 2012, having application Ser. No. 13/363,654, U.S. Patent Application entitled "AUTHENTICATION MANAGEMENT SERVICES" filed on Feb. 1, 2012, having application Ser. No. 13/363,664, U.S. Patent Application entitled "PRESENTING MANAGED SECURITY CREDENTIALS TO NETWORK SITES" filed on Feb. 1, 2012, having application Ser. No. 13/363,675, U.S. Patent Application entitled "RECOVERY OF MANAGED SECURITY CREDENTIALS" filed on Feb. 1, 2012, having application Ser. No. 13/363,681, U.S. Patent Application entitled "LOGOUT FROM MULTIPLE NETWORK SITES" filed on Feb. 1, 2012, having application Ser. No. 13/363,685, U.S. Patent Application entitled "INFORMATION MANAGER" filed on Feb. 20, 2013, having application Ser. No. 13/771,373, and U.S. Patent Application entitled "PROXY SERVER-BASED NETWORK SITE ACCOUNT MANAGEMENT" filed on Mar. 11, 2013, having application Ser. No. 13/792,678, which are incorporated herein by reference in their entirety.

Next, a general description of the operation of the various components of the networked environment 200a is provided. To begin, a user creates accounts with multiple account providers. For example, the user may manually create an account using legacy account creation procedures (e.g., via forms in network pages). Alternatively, the user may employ the account management logic 230 to create accounts. The account management logic 230 may obtain a specification of what is required to create a particular account, render a user interface 236 to obtain the necessary information, and submit an account creation request to the account management endpoint 218 for a particular account provider.

In one embodiment, the account management logic 230 may be used to fill an account creation form rendered in a browser. In some situations, stored personal information 245 may be used in account creation and/or the user may be prompted to enter additional personal information. Such manually entered additional personal information may then be stored in the stored personal information 245 and may be used to create the personal information mappings 242. As accounts are created, account data 248, including security credentials 254, may be obtained and stored in the data store 239. If an account was previously created, the user may provide information to the account management logic 230 to facilitate generating the personal information mappings 242, the stored personal information 245, the account data 248, and/or other data. In some scenarios, the account management logic 230 may be configured to download the personal information mappings 242, the stored personal information 245, and/or the account data 248 via the network 209 from a server that hosts such data on behalf of the user.

After various accounts are created, a user may wish to make changes to the personal information used by the accounts of the user. In a first embodiment, the user may authenticate with an account provider and navigate to a network page of the account provider that includes a form configured to facilitate updating the user's information. The account management logic 230 may detect or intercept this activity. In response, the account management logic 230 may scrape the changed information entered by the user via the form. Alternatively, the account management logic 230 may present a user interface 236 that allows the user to confirm his or her intentions and enter the information to be changed in a structured manner.

In a second embodiment, the user may launch a personal information editor function of the account management logic 230. The account management logic 230 may render a user interface 236 that allows the user to view the various stored personal information 245, update the stored personal information 245, add or modify mappings of the stored personal information 245, and/or perform other functions.

In either embodiment, the user may be presented with an opportunity to update corresponding personal information used by multiple accounts with multiple account providers. For example, when a user enters a new last name, the last name may be linked via personal information mappings 242 with two accounts corresponding to two different account providers. The account management logic 230 may identify the two accounts that rely upon the last name information and then send a request for a personal information update 234 to the corresponding account management endpoints 218. For example, the account management logic 230 may fill forms on predefined network pages and/or make a web service call via an API. Prior to, or during, the sending of the personal information update 234, the account management logic 230 authenticates with the account management endpoint 218 using the account data 248, and particularly, the security credentials 254. Upon committing the update, the account management endpoint 218 may return an update confirmation 235, and the account management logic 230 may render a confirmation or other output indicating whether the update operation succeeded or failed.

The updated personal information provided by the user may be stored in the data store 239 in the stored personal information 245. The updated, stored personal information 245 may then be used for subsequent account creations and/or modifications using the account management logic 230.

It is noted that the updating process driven by the account management logic 230 may happen more or less automatically. In contrast to a user manually entering updated information through differing network page forms of the multiple account providers, the user may enter the updated information one time, with the updates being automatically propagated for multiple accounts with potentially multiple account providers via the account management logic 230. However, a user may still maintain control as to how the updates are made.

For example, the account management logic 230 may render a user interface 236 that allows the user to enter selection criteria for accounts to be updated with the changed information. The user may manually select specific accounts or may enter criteria by which multiple accounts may be automatically selected. To illustrate, the account management logic 230 may enable the user to classify various accounts, e.g., "shopping," "social networking," "home," "work," etc. In updating information, the user may select one or more account classifications to which the update is to apply. In another example, the user may enter a regular expression in order to select accounts having names that match the regular expression. In yet another example, the user may enter a time frame for selection, e.g., select only those accounts that have been used within the past six months. In some cases, different classes of accounts may be selected for propagation of different forms of updated data. For example, a certain pseudonym may be provided for a "name" field for a first grouping of accounts, while the user's real name may be provided for a "name" field for a second grouping of accounts. In another scenario, automatically generated pseudonyms may be provided for the "name" field for each of the first grouping of accounts.

Via the personal information mappings 242, the user may also be able to configure how the updated information maps to the data items used by the various accounts. If a user provides an updated name, the user may map the updated name to a "real name" data item used by a social networking account but not a "display name" data item used by the same social networking account. In addition, the user may configure the personal information mappings 242 to apply transformations to one or more updated items of stored personal information 245 to produce data items in the personal information update 234. Such transformations may include, for example, substrings, concatenations, case changes, partial replacements, language translations, and/or other transformations.

The account management logic 230 may be configured via the account management preferences 251 for various types of updates. In one type, the personal information updates 234 may be sent synchronously in response to detecting a change to the personal information of the user. In another type, the personal information updates 234 may be sent periodically (e.g., weekly). Periodic updates may thus include multiple different updates in a fewer number of update requests to reduce request-caused overhead. In some cases, the account management logic 230 may be configured to defer an update that is categorized as less important.

In some scenarios, the account management logic 230 may obtain the updated personal information automatically, without the user even attempting to modify stored personal information 245 or explicitly providing updated information. For example, the account management logic 230 may automatically detect a change to the global positioning system (GPS) location of the user's home, and then automatically (or subject to user confirmation, if desired) push an update of the user's home coordinates to one or more account providers.

The account management logic 230 may be configured to update the personal information mappings 242 and/or other configuration metadata from time to time. Such metadata may facilitate communication between the account management logic 230 and the account management endpoint 218, as well as detecting personal information being provided by users via network page forms. Such metadata may be obtained automatically from the various network data servers 215 on demand in response to a client application 233 accessing the network data servers 215 and/or on a periodic basis. In some cases, the metadata may be crowd-sourced or otherwise provided by a third-party.

Figure 2B:
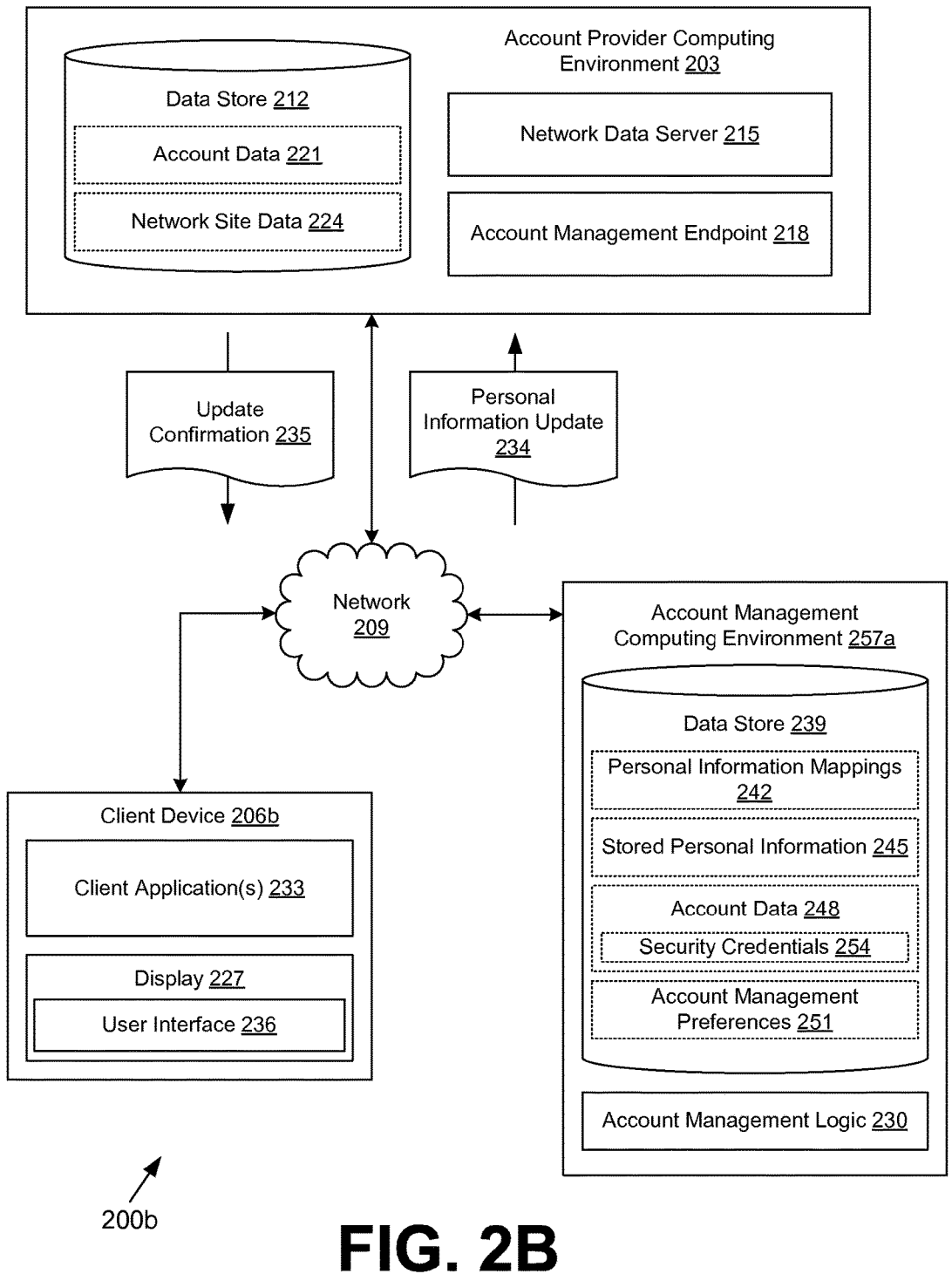

Referring next to FIG. 2B, shown is a networked environment 200b according to various embodiments. The networked environment 200b includes an account provider computing environment 203, an account management computing environment 257a and a client device 206b in data communication with each other via a network 209.

The account management computing environment 257a may comprise, for example, a server computer or any other system providing computing capability. Alternatively, the account management computing environment 257a may employ a plurality of computing devices that may be arranged, for example, in one or more server banks or computer banks or other arrangements. Such computing devices may be located in a single installation or may be distributed among many different geographical locations. For example, the account management computing environment 257a may include a plurality of computing devices that together may comprise a hosted computing resource, a grid computing resource, and/or any other distributed computing arrangement. In some cases, the account management computing environment 257a may correspond to an elastic computing resource where the allotted capacity of processing, network, storage, or other computing-related resources may vary over time.

In contrast to the embodiments of FIG. 2A, the embodiments of FIG. 2B push the account management logic 230 and the data store 239 to a separate account management computing environment 257a. The use of an account management computing environment 257a may enable the user to access the functions of the account management logic 230 via multiple different client devices 206b. In some cases, the account management logic 230 may remain upon the client device 206b, while some or all of the data in the data store 239 is hosted by the account management computing environment 257a. The account management computing environment 257a may be operated by an account management provider or may be operated by the user (e.g., the account management computing environment 257a may correspond to a broadband router, home gateway, network attached storage device, or other device on a local network 209 of a user.)

In embodiments of FIG. 2B, a client application 233 may be responsible for downloading account data 248 in an encrypted format from the account management computing environment 257a and to authenticate user access to the accounts. The client application 233 may also provide a front-end user interface 236 for the user to manage the stored personal information 245 and updates to the stored personal information 245. The client application 233 in this case may also facilitate detecting changes to personal information, such as, for example, detecting when a user manually provides changed personal information in a network page form. However, functions related to sending the personal information updates 234 may be offloaded to the account management computing environment 257a.

Figure 2C:
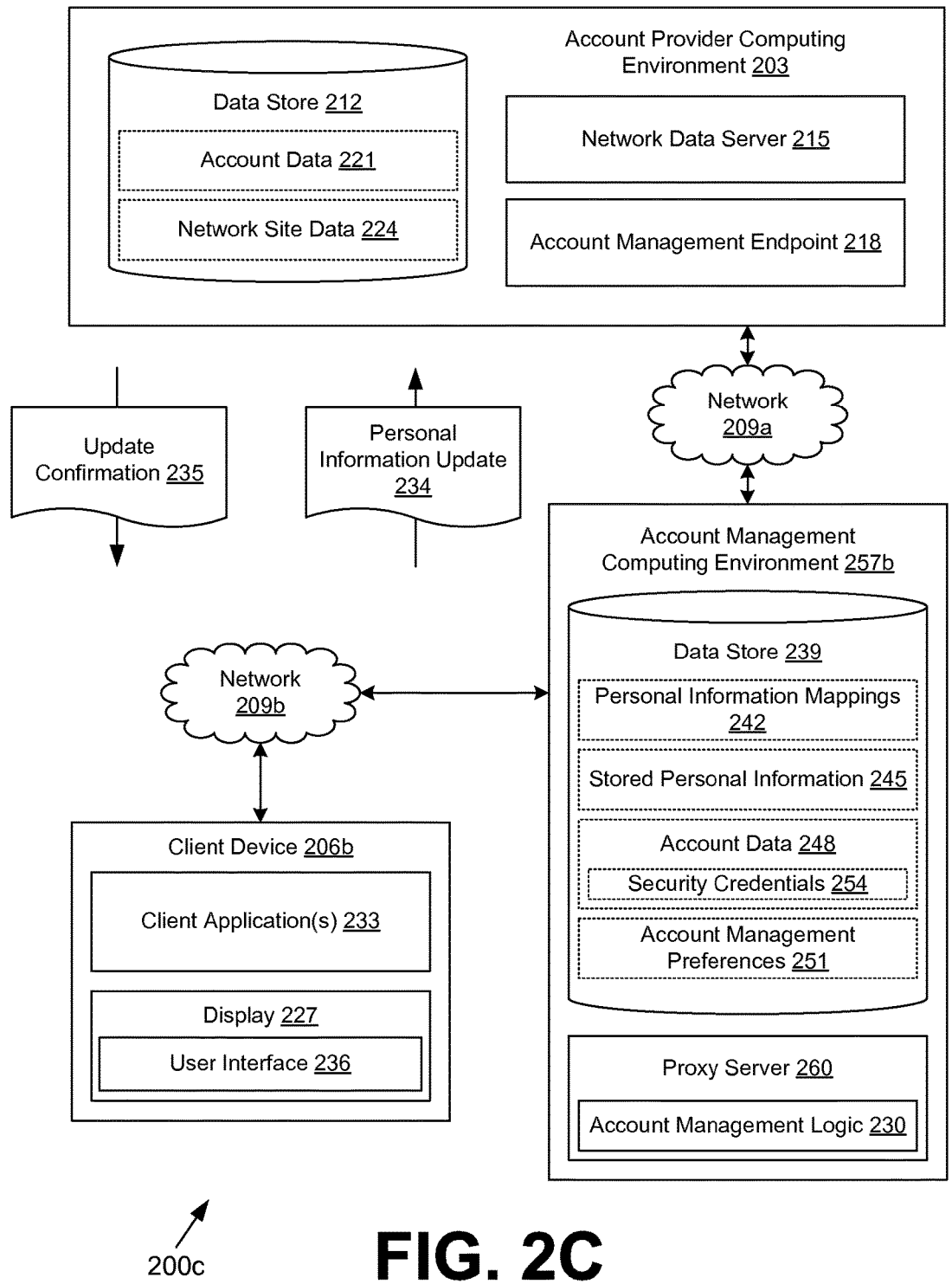

Continuing to FIG. 2C, shown is a networked environment 200c according to various embodiments. The networked environment 200c includes an account provider computing environment 203, an account management computing environment 257b and a client device 206b in data communication via networks 209a and 209b. Specifically, the account provider computing environment 203 and the account management computing environment 257b are in data communication via the network 209a, and the account management computing environment 257b and the client device 206b are in data communication via the network 209b.

In the embodiments of FIG. 2C, the account management logic 230 may be implemented as part of a proxy server 260 of the account management computing environment 257b. In this way, network page requests and/or other network traffic from the client device 206b to the account provider computing environment 203 may be routed through the account management computing environment 257b. In some embodiments of FIG. 2C, the account management computing environment 257b may be implemented in a firewall, router, and/or other network device.

By implementing the account management logic 230 in conjunction with a proxy server 260, the account management logic 230 may be able to intercept user updates of personal information with minimal configuration client-side. To this end, the account management logic 230 may also transparently manage log-ins to various accounts managed by the account management logic 230. For example, when opening a browser, a network page generated via the proxy server 260 may be provided. The user may enter a master password via the network page, and subsequently, requests for network pages associated with managed accounts may result in automatic log-ins being performed by the account management logic 230 and the proxy server 260. In this way, the account management logic 230 may be able to detect and intercept updated personal information provided by users via network page forms. Consequently, the account management logic 230 in the account management computing environment 257b may initiate a workflow to generate and send the personal information updates 234 for various accounts managed by the account management logic 230.

Figure 3A:
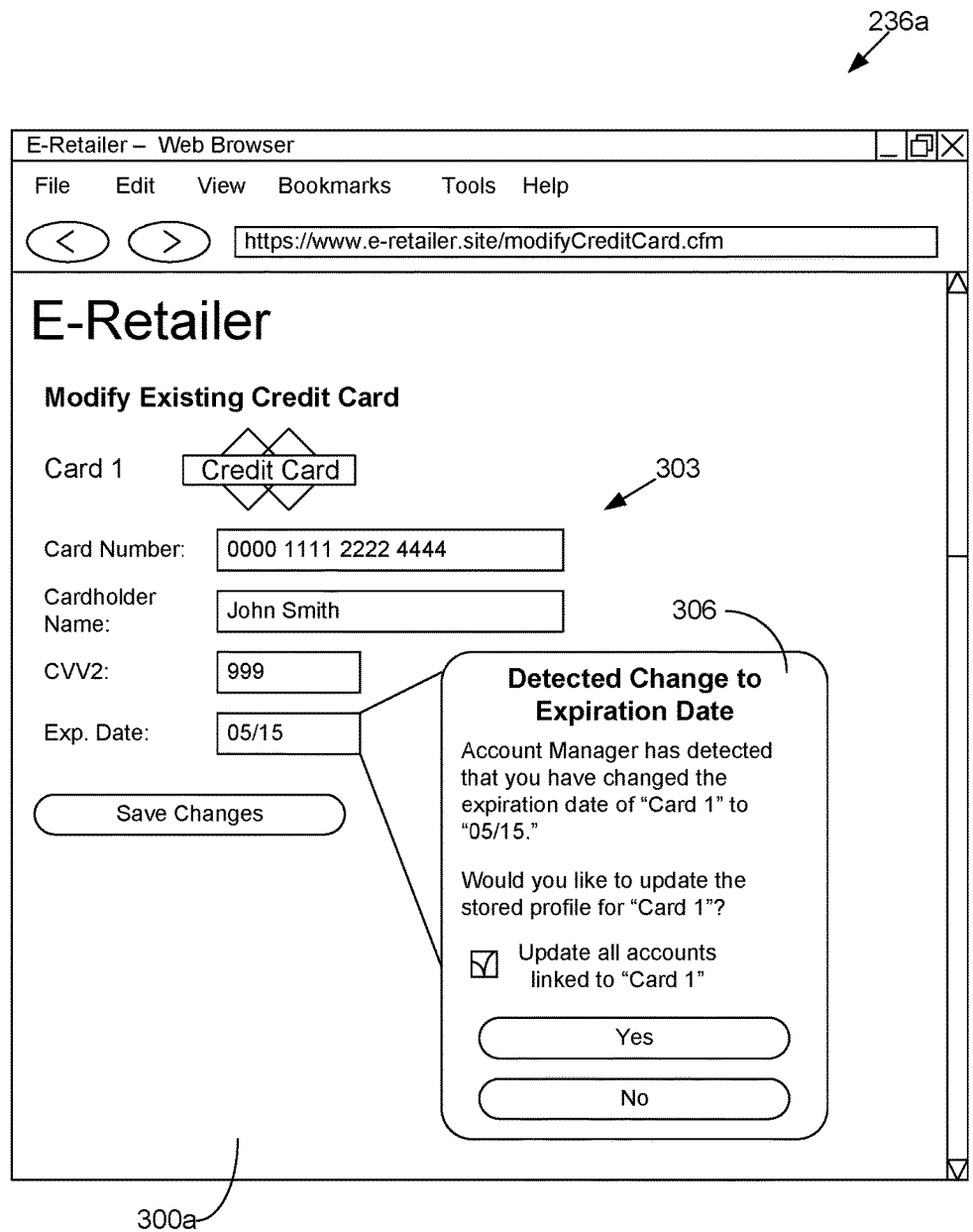
FIGS. 3A-3D are pictorial diagrams of an example user interfaces rendered by a client device in the networked environments of FIGS. 2A-2C according to various embodiments of the present disclosure.

Turning now to FIG. 3A, shown is one example of a user interface 236a rendered by a client application 233 (FIG. 2A) and the account management logic 230 (FIG. 2A) executed in a client device 206a (FIG. 2A) in a networked environment 200a (FIG. 2A) according to various embodiments. The user interface 236a in this example corresponds to a network page 300a rendered by a browser application. The network page 300a may be served up by the network data server 215 (FIG. 2A).

The network page 300a facilitates updating the account data 221 (FIG. 2A) associated with a user account. In this example, the network page 300a facilitates updating an existing credit card ("Card 1") associated with the user account. The network page 300a provides form fields 303 for entering a card number, a cardholder name, a card verification value (CVV), and an expiration date, all of which have been prepopulated using existing account data 221.

Here, the user has entered an expiration date of "05/15" to replace a previous expiration date.

In response to the user entering the new expiration date, the account management logic 230 has generated the component 306. The component 306 explains that the account management logic 230 has detected a change to the expiration date. The component 306 prompts the user to confirm whether the change to the expiration date should be updated in a locally stored profile associated with the particular user account. The component 306 may include a checkbox or other selection mechanism for the user to designate whether the update should be propagated by the account management logic 230 to all user accounts that rely upon the same "Card 1" credit card. For example, this may be the first time that the user has used the updated information, and the user may want to try the updated credit card with the particular network site before propagating it to all accounts. While a manual confirmation is elicited in this example, it is understood that in other examples, the update may be made automatically without user confirmation.

Figure 3B:
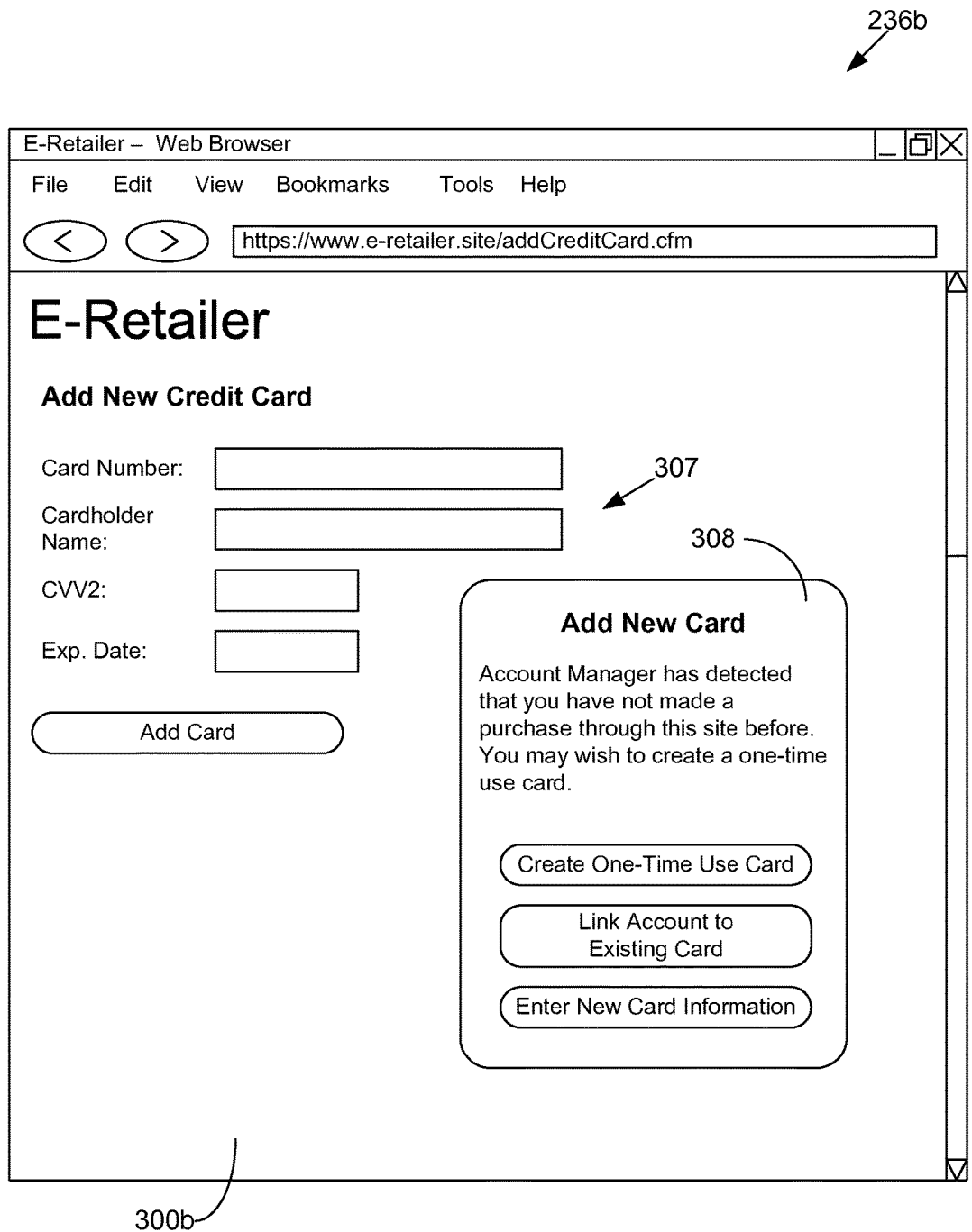

Continuing to FIG. 3B, shown is one example of a user interface 236b rendered by a client application 233 (FIG. 2A) and the account management logic 230 (FIG. 2A) executed in a client device 206a (FIG. 2A) in a networked environment 200a (FIG. 2A) according to various embodiments. The user interface 236a in this example corresponds to a network page 300b rendered by a browser application. The network page 300b may be served up by the network data server 215 (FIG. 2A).

The network page 300b facilitates adding a new credit card to a user account. The network page 300b provides form fields 307 for entering a card number, a cardholder name, a card verification value (CVV), and an expiration date. In response to detecting that the user is adding a new credit card to the user account, the account management logic 230 has generated the component 308. The component 308 explains that the account management logic 230 has detected that the user has not made a purchase through the particular network site previously and suggests that the user creates a one-time use card, or perhaps, a card with a particular stored value or relatively low credit limit. The component 308 facilitates selection from various options: creating a one-time use card, linking the user account to an existing card, or entering new card information.

In addition to one-time use cards, the account management logic 230 may provide an option to the user to employ a closed-loop stored value payment instrument. Various embodiments involving closed-loop stored value payment instruments are described by U.S. patent application Ser. No. 13/925,283, entitled "CLOSED-LOOP STORED VALUE PAYMENT INSTRUMENT BROKERAGE," and filed on Jun. 24, 2013, which is incorporated herein by reference in its entirety.

In some cases, the account management logic 230 may provide an option to the user to employ an account-specific shadow card number. Various embodiments involving generation and use of account provider-based shadow account numbers are described by U.S. Pat. No. 8,423,467, which is incorporated herein by reference in its entirety. In such embodiments, shadow accounts are created and associated with a master account (e.g., the user's primary credit card account). Rules regarding the use of the shadow accounts are also established, such as tying the shadow accounts to specific account providers. Stolen or otherwise compromised shadow account numbers may be useless with other non-associated account providers. In addition, the shadow numbers can be easily invalidated while leaving the master account untouched.

In addition to payment information, the user may be given the option to create other temporary personal information to be provided to the account provider. Various embodiments involving creating disposable, temporary identities are described by U.S. Pat. No. 8,549,597, which is incorporated herein by reference in its entirety. Creation of temporary identities may include creation of temporary personal information such as names, physical addresses, email addresses, and so on.

In one example, a user may be modifying an existing card or other existing personal information linked to multiple user accounts. In such a case, the user may be given the option to associate all of the multiple user accounts with respective one-time use cards, respective account provider-specific account numbers, respective closed-loop stored value payment instruments, respective temporary identities, and so on.

Figure 3C:
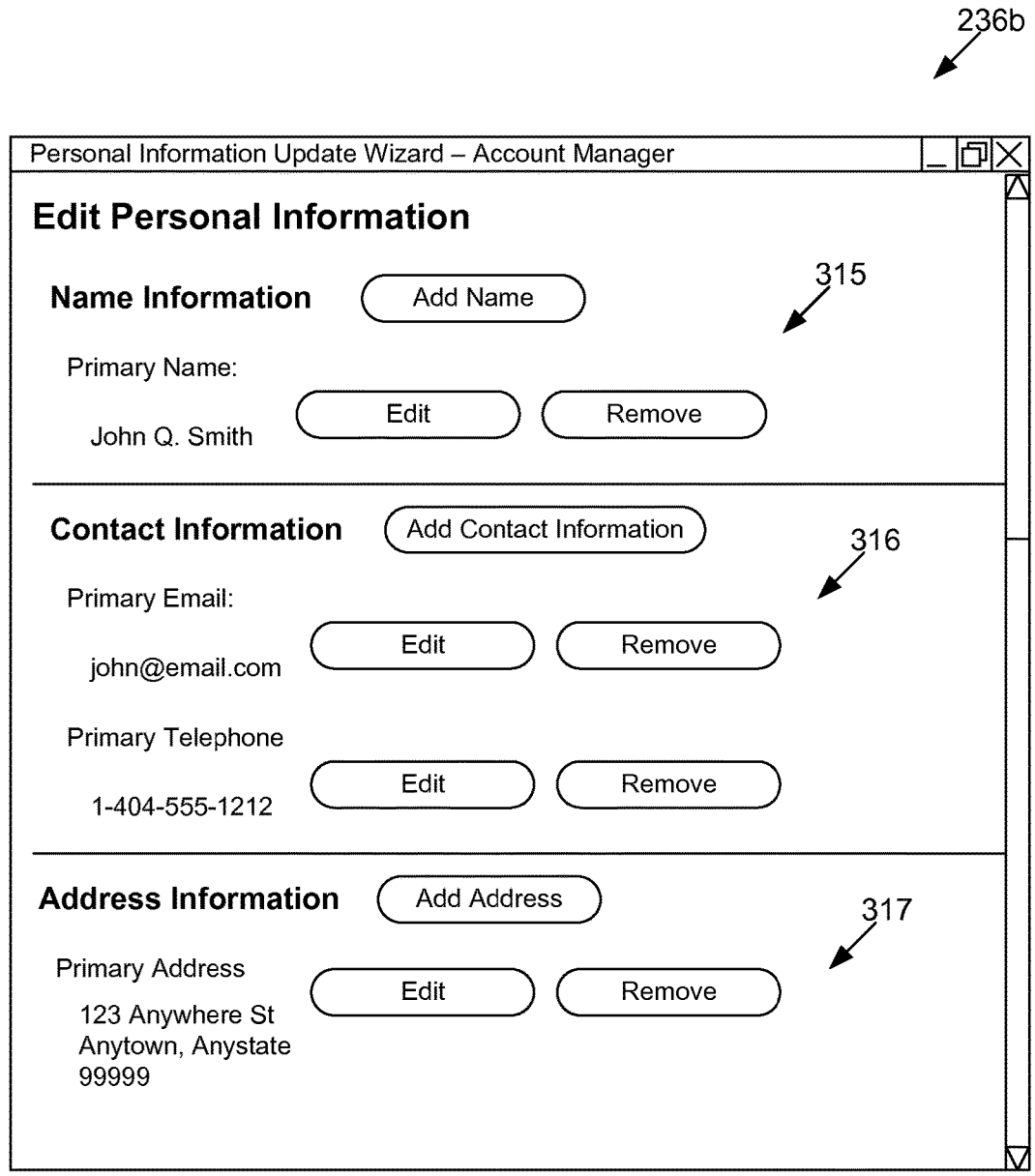

Moving on to FIG. 3C, shown is one example of a user interface 236c rendered by the account management logic 230 (FIG. 2A) executed in a client device 206a (FIG. 2A) in a networked environment 200a (FIG. 2A) according to various embodiments. The user interface 236c in this example corresponds to a personal information editor interface configured to facilitate management of stored personal information 245 (FIG. 2A) by a user.

Specifically, the user interface 236c facilitates management of name information 315 including a primary name, contact information 316 including a primary email address and a primary telephone, address information 317 including a primary address, and/or other types of information. A user may be able to add additional names, contact information, addresses, etc., via the user interface 236c, remove existing names, contact information, addresses, etc., via the user interface 236c, edit existing names, contact information, addresses, etc., via the user interface 236c, and/or perform other functions.

Figure 3D:
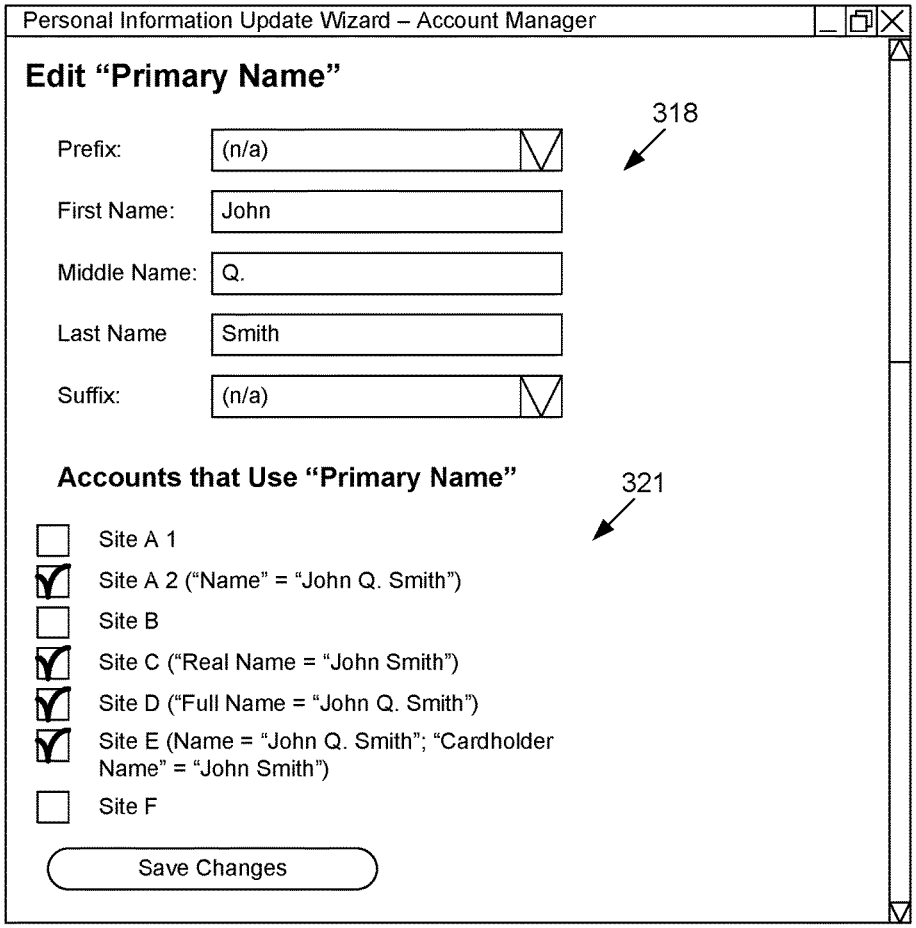

With reference to FIG. 3D, shown is one example of a user interface 236d rendered by the account management logic 230 (FIG. 2A) executed in a client device 206a (FIG. 2A) in a networked environment 200a (FIG. 2A) according to various embodiments. The user interface 236d in this example corresponds to a personal information editor interface configured to edit the "primary name" from the user interface 236c (FIG. 3C). The user interface 236d includes editing components 318 configured to facilitate modification of data items that comprise the "primary name." Such data items may include a prefix, a first name, a middle name, a last name, a suffix, and/or other information. The editing components 318 may include text input fields, drop-down boxes, checkboxes, radio buttons, sliders, and/or other user interface components.

The user interface 236d also may include account selection components 321 for selecting a subset of accounts from a superset of accounts for the user. The account selection components 321 enable the user to specify which accounts use the "primary name" data. In some embodiments, the accounts may be automatically selected based at least in part on metadata associated with the account providers. In this example, the account selection components 321 include checkboxes to allow user selection from accounts managed by the account management logic 230. As shown in FIG. 3D, the accounts include "Site A 1," "Site A 2," "Site B," "Site C," "Site D," "Site E," and "Site F." It is noted that there may be multiple accounts with a single account provider (e.g., "Site A 1" and "Site A 2").

In this example, only the accounts for "Site A 2," "Site C," "Site D," and "Site E" are selected to use the "primary name" data. The selected accounts may use different formats of the "primary name" data as provided in the personal information mappings 242 (FIG. 2A). For example, "Site A 2" uses the first name, middle name, and last name data items for its "Name" field in the account data 221 (FIG. 2A), but "Site C" uses only the first name and the last name for its "Real Name" field in its account data 221. Further, some accounts (e.g., "Site E") may use the "primary name" data to map to multiple fields in the account data 221 (e.g., "Name" uses first name, middle name, and last name, while "Cardholder Name" uses only first name and last name). Thus, account update requests may specify that a data item is to be updated in different types of personal information fields. Additionally, the user interface 236d may allow a user to map one type of personal information for one account (e.g., data from "Real Name") to another type of personal information for another account (e.g., data in "Cardholder Name"). Changes to the data via the editing components 318 and/or changes to selected accounts via the account selection components 321 may result in the account management logic 230 initiating personal information updates 234 (FIG. 2A) for one or more accounts.

Figure 4:
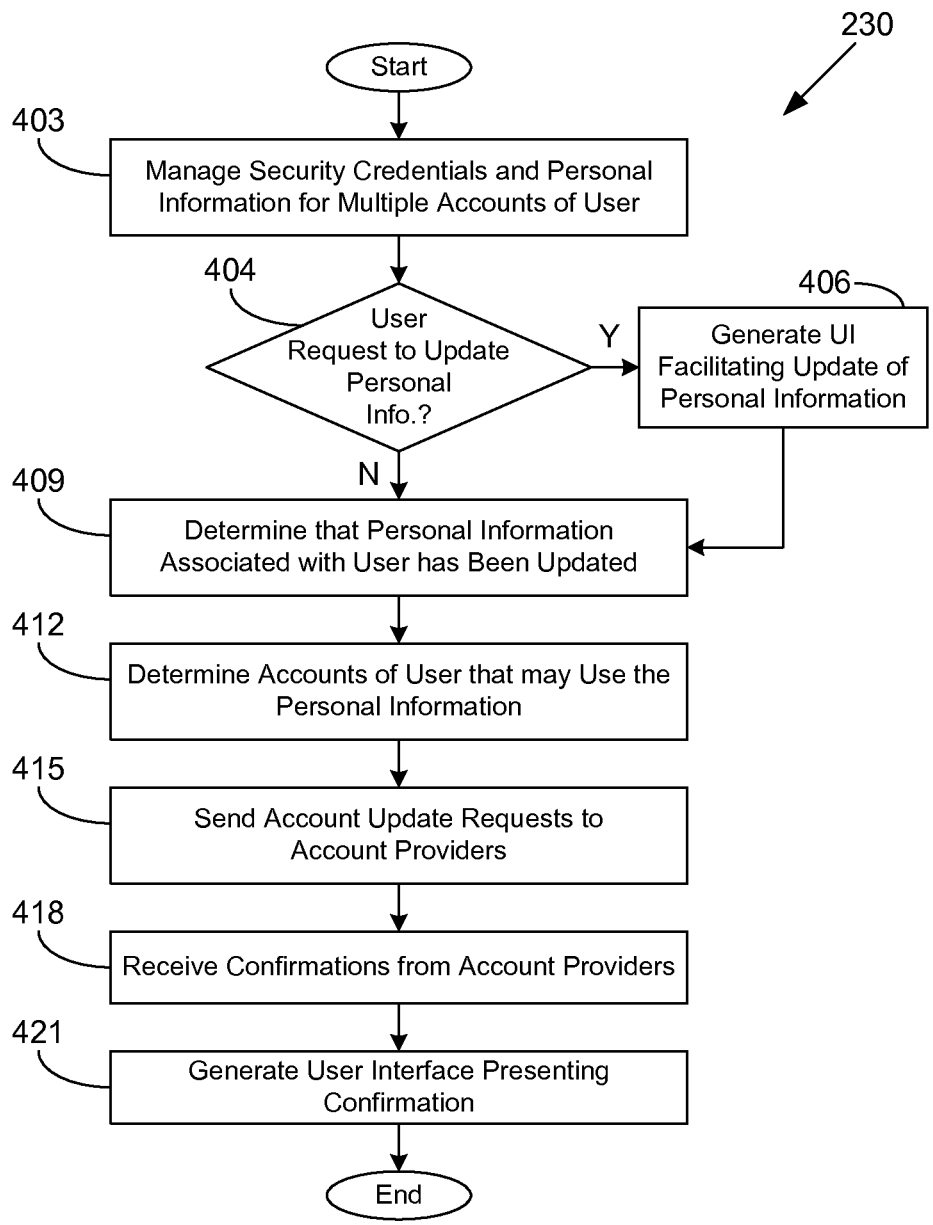
FIG. 4 is a flowchart illustrating one example of functionality implemented as portions of account management logic executed in a client device or other computing environment in the networked environments of FIGS. 2A-2C according to various embodiments of the present disclosure.

Referring next to FIG. 4, shown is a flowchart that provides one example of the operation of a portion of the account management logic 230 according to various embodiments. It is understood that the flowchart of FIG. 4 provides merely an example of the many different types of functional arrangements that may be employed to implement the operation of the portion of the account management logic 230 as described herein. As an alternative, the flowchart of FIG. 4 may be viewed as depicting an example of elements of a method implemented in the client device 206a (FIG. 2A) or the account management computing environment 257a (FIG. 2B) or 257b (FIG. 2C) according to one or more embodiments.

Beginning with box 403, the account management logic 230 manages security credentials and personal information for multiple accounts of a user. For example, a user may provide account data 248 (FIG. 2A) for previously created accounts to the account management logic 230 so that the account management logic 230 may take over account management and/or authentication functions for the accounts. The account management logic 230 may manage a credential data store with the security credentials 254 (FIG. 2A) and/or a personal information data store with the stored personal information 245 (FIG. 2A).

In box 404, the account management logic 230 determines whether a user has requested to update personal information. For example, the user may explicitly launch a user interface 236 such as that shown in FIGS. 3C and 3D to update personal information. If the user has requested to update personal information, the account management logic 230 proceeds to box 406. Otherwise, the account management logic 230 continues to box 409. In box 406, the account management logic 230 may generate a user interface 236 that facilitates updating of personal information. Such a user interface 236 may correspond to example user interfaces 236c (FIG. 3C) or 236d (FIG. 3D). In other scenarios, a user interface 236 that facilitates updating of personal information may be rendered by a browser or other client application 233 (FIG. 2A). The account management logic 230 continues to box 409.

In box 409, the account management logic 230 determines that personal information has been updated. The personal information that has been updated may correspond to personal information that was not previously provided and/or modifications to previously provided personal information. In some scenarios, the account management logic 230 may detect that personal information has been updated automatically without a user taking any specific action to change personal information. For example, the user may begin using a client device 206a (FIG. 2A) that is registered to a different telephone number. In other scenarios, the user may attempt to manually change personal information for an account or may enter changed personal information in the process of creating a new account. The account management logic 230 may determine that personal information has changed by comparing information currently being provided by a user to previously provided stored personal information 245. Where the account management logic 230 is implemented in a proxy server 260 (FIG. 2C), the account management logic 230 may intercept submissions of network page forms that include updated personal information.

In box 412, the account management logic 230 determines the accounts of the user that may use the stored personal information 245. These accounts may include accounts that currently rely upon the stored personal information 245 and/or accounts that currently use or are capable of using the stored personal information 245 so as to rely upon the stored personal information 245 in the future. In some situations, an account may be slated for future creation by way of an account creation request. In box 415, the account management logic 230 initiates the personal information updates 234 (FIG. 2A) by sending account update requests to the respective account provider computing environments 203 (FIG. 2A). In order to send an account update request, the account management logic 230 may first authenticate with, or log-on to, an account management endpoint 218 (FIG. 2A) for the account using a security credential 254 (FIG. 2A). In some cases, the account update request may correspond to an account creation request.

To effect the information update, the account management logic 230 may identify a network page form for an individual account, fill the network page form using the updated personal information, and then submit the network page form to effect an update for the individual account. Alternatively, the account management logic 230 may make one or more web service calls to the account management endpoint 218 using an API. In some situations, account updates may be caused by a change in selection status of an account, a change in information required by an account, and/or a change to a personal information mapping 242 (FIG. 2A) rather than a change to stored personal information 245. In some scenarios, the account management logic 230 may be configured to validate the updated personal information before propagating the personal information updates 234. For example, the account management logic 230 may perform checksums, address validation, expiration date verification, email address verification, and/or other validation procedures.

In box 418, the account management logic 230 receives update confirmations 235 (FIG. 2A) from the account provider computing environments 203. In box 421, the account management logic 230 may generate a user interface 236 that presents a confirmation as to the success of the update. If applicable, the user interface 236 may present an indication of failure as to the update with respect to one or more accounts. Thereafter, the portion of the account management logic 230 ends.

Figure 5:
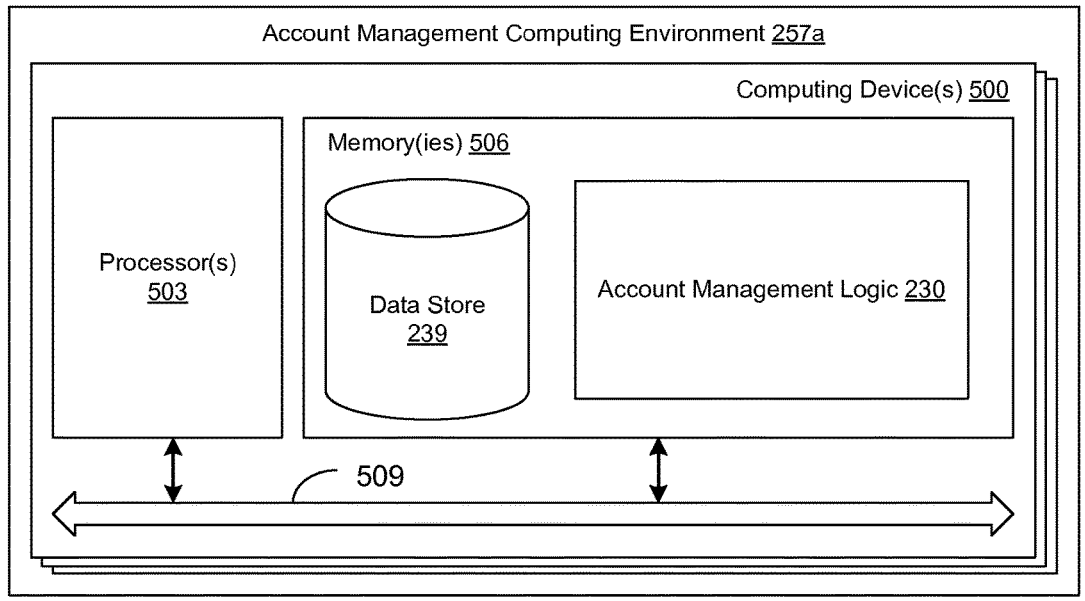
FIG. 5 is a schematic block diagram that provides one example illustration of an account management computing environment employed in the networked environments of FIGS. 2B and 2C according to various embodiments of the present disclosure.

With reference to FIG. 5, shown is a schematic block diagram of the account management computing environment 257a according to an embodiment of the present disclosure. The account management computing environment 257a includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated. It is understood that the account management computing environment 257b (FIG. 2C) and the account provider computing environment 203 (FIG. 2A) may be similar to the account management computing environment 257a and include computing devices 500.

Stored in the memory 506 are both data and several components that are executable by the processor 503. In particular, stored in the memory 506 and executable by the processor 503 is the account management logic 230 and potentially other applications. Also stored in the memory 506 may be a data store 239 and other data. In addition, an operating system may be stored in the memory 506 and executable by the processor 503.

Figure 6:
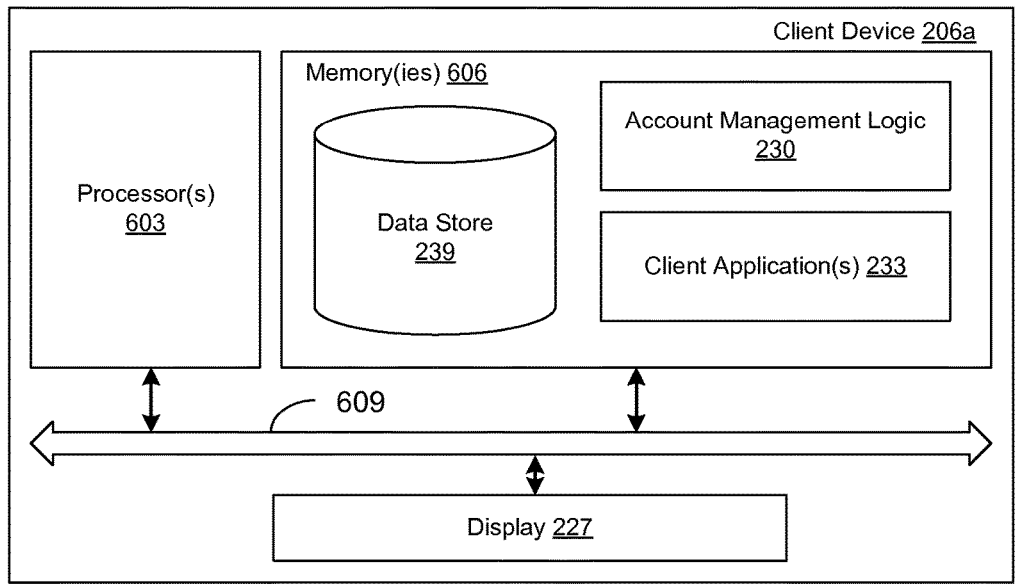
FIG. 6 is a schematic block diagram that provides one example illustration of a client device employed in the networked environment of FIG. 2A according to various embodiments of the present disclosure.

Turning now to FIG. 6, shown is a schematic block diagram of the client device 206a according to an embodiment of the present disclosure. The client device 206a includes at least one processor circuit, for example, having a processor 603 and a memory 606, both of which are coupled to a local interface 609. The display 227 may also be coupled to the local interface 609. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the account management logic 230, one or more client applications 233, and potentially other applications. Also stored in the memory 606 may be a data store 239 and other data. In addition, an operating system may be stored in the memory 606 and executable by the processor 603. It is understood that the client devices 206b may be implemented similarly to the client device 206a.

Referring now to both FIGS. 5 and 6, it is understood that there may be other applications that are stored in the memories 506, 606 and are executable by the processors 503, 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memories 506, 606 and are executable by the processors 503, 603. In this respect, the term "executable" means a program file that is in a form that can ultimately be run by the processors 503, 603. Examples of executable programs may be, for example, a compiled program that can be translated into machine code in a format that can be loaded into a random access portion of the memories 506, 606 and run by the processors 503, 603, source code that may be expressed in proper format such as object code that is capable of being loaded into a random access portion of the memories 506, 606 and executed by the processors 503, 603, or source code that may be interpreted by another executable program to generate instructions in a random access portion of the memories 506, 606 to be executed by the processors 503, 603, etc. An executable program may be stored in any portion or component of the memories 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 506, 606 are defined herein as including both volatile and nonvolatile memory and data storage components. Volatile components are those that do not retain data values upon loss of power. Nonvolatile components are those that retain data upon a loss of power. Thus, the memories 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 503, 603 may represent multiple processors 503, 603 and/or multiple processor cores and the memories 506, 606 may represent multiple memories 506, 606 that operate in parallel processing circuits, respectively. In such a case, the local interfaces 509, 609 may be an appropriate network that facilitates communication between any two of the multiple processors 503, 603, between any of processors 503, 603 and any of the memories 506, 606, or between any two of the memories 506, 606, etc. The local interfaces 509, 609 may comprise additional systems designed to coordinate this communication, including, for example, performing load balancing. The processors 503, 603 may be of electrical or of some other available construction.

Although the account management logic 230, the client applications 233, the proxy server 260 (FIG. 2C), the network data server 215 (FIG. 2A), the account management endpoint 218 (FIG. 2A), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the account management logic 230. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503, 603 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the account management logic 230, the client applications 233, the proxy server 260, the network data server 215, and the account management endpoint 218, that comprises software or code can be embodied in any non-transitory computer-readable medium for use by or in connection with an instruction execution system such as, for example, a processor 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the account management logic 230, the client applications 233, the proxy server 260, the network data server 215, and the account management endpoint 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, 600 or in multiple computing devices in the same computing environment. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a client computing device, wherein when executed, the program causes the client computing device to perform a method comprising:
    managing, by the client computing device, security credentials and personal information for a plurality of accounts of a user with a plurality of account providers;
    detecting, by the client computing device, that the user has updated an item of personal information by at least one of: detecting changed information entered by the user on a form on a network page of a particular account provider of the plurality of account providers, or receiving an update to the item of personal information through a personal information editor user interface generated by the program;
    identifying, by the client computing device, at least two of the plurality of accounts that currently use or are capable of using the item of personal information;
    causing a user interface to be rendered on a display associated with the client computing device, the user interface including a selectable component that, when selected by the user, causes the item of personal information to be automatically updated for the at least two of the plurality of accounts;
    authenticating, by the client computing device, with individual ones of the plurality of account providers that correspond to the at least two of the plurality of accounts using corresponding security credentials managed by the program;
    automatically sending, by the client computing device, corresponding requests to update the item of personal information to the individual ones of the plurality of account providers after authenticating by at least one of: making at least one web service call to a respective account management endpoint using an application programming interface (API), or programmatically filling out and submitting a respective network page form; and causing a confirmation to be rendered on the display associated with the client computing device that the item of personal information has been updated for the at least two of the plurality of accounts.

2. The non-transitory computer-readable medium of claim 1, wherein the item of personal information comprises at least one of: a name of the user, an address of the user, or a payment instrument of the user.

3. A system, comprising:
    a client computing device; and
    an account management application executed in the client computing device, wherein when executed the account management application causes the client computing device to at least:
        determine that personal information associated with a user has been updated;
        determine a plurality of accounts of the user with a plurality of account providers that may use the personal information; and
        automatically send corresponding account update requests for the plurality of accounts to individual ones of the plurality of account providers by at least one of: making at least one web service call to a respective account management endpoint using an application programming interface (API), or programmatically filling out and submitting a respective network page form, the corresponding account update requests specifying the personal information that has been updated.

4. The system of claim 3, wherein at least one of the corresponding account update requests is an account creation request.

5. The system of claim 3, wherein when executed the account management application further causes the client computing device to at least:
    manage a credential data store that includes corresponding security credentials for individual ones of the plurality of accounts; and
    manage a personal information data store that includes corresponding personal information for the individual ones of the plurality of accounts.

6. The system of claim 3, wherein when executed the account management application further causes the client computing device to at least generate a user interface configured to facilitate a user selection of a subset of accounts from a superset of accounts of the user, the plurality of accounts corresponding to the subset of accounts.

7. The system of claim 6, wherein when executed the account management application further causes the client computing device to at least determine the subset of accounts in response to receiving a criterion for account selection.

8. The system of claim 3, wherein when executed the account management application further causes the client computing device to at least generate a user interface configured to facilitate a user mapping of a first type of personal information associated with a first account of the plurality of accounts to a second type of personal information associated with a second account of the plurality of accounts.

9. The system of claim 3, wherein at least two of the corresponding account update requests specify that a data item is to be updated in different types of personal information fields.

10. The system of claim 3, wherein when executed the account management application further causes the client computing device to at least detect that the user has manually provided different personal information in a network page form, the different personal information differing from previously stored personal information.

11. The system of claim 3, wherein when executed the account management application further causes the client computing device to at least:
generate a user interface configured to facilitate modifying stored personal information; and
identify a modification to the stored personal information via the user interface.

12. The system of claim 3, wherein the personal information that has been updated excludes security credentials.

13. The system of claim 3, wherein when executed the account management application further causes the client computing device to at least:
identify a corresponding security credential for an individual account in the plurality of accounts;
identify the respective account management endpoint for the individual account;
authenticate with the respective account management endpoint using the corresponding security credential; and
send a corresponding account update request to the respective account management endpoint.

14. The system of claim 13, wherein the API is a web services API.

15. The system of claim 3, wherein when executed the account management application further causes the client computing device to at least:
identify the respective network page form for an individual account in the plurality of accounts;
fill the respective network page form based at least in part on the personal information that has been updated; and
submit the respective network page form to effect an update for the individual account with a corresponding one of the plurality of account providers.

16. The system of claim 3, wherein when executed the account management application further causes the client computing device to at least:
identify a corresponding security credential for an individual account in the plurality of accounts;
identify the respective network page form for the individual account;
fill the respective network page form based at least in part on the corresponding security credential; and
submit the respective network page form in order to authenticate with a corresponding one of the plurality of account providers for the individual account.

17. The system of claim 3, wherein the account management application is implemented by a proxy server executed by the client computing device, the client computing device being associated with the user.

18. The system of claim 3, wherein the account management application is implemented by a client application executed by the client computing device, the client computing device being associated with the user.

19. A method, comprising:
generating, via a client computing device, a user interface including a listing of personal information associated with a plurality of accounts of a user, the plurality of accounts corresponding to a plurality of account providers;
receiving, via the client computing device, a modification to an item of personal information from the user via the user interface;
identifying, via the client computing device, at least two of the plurality of accounts associated with the item of personal information; and
initiating, via the client computing device, corresponding updates of the item of personal information for the at least two of the plurality of accounts according to the modification by at least one of: making at least one web service call to a respective account management endpoint using an application programming interface (API), or programmatically filling out and submitting a respective network page form.

20. The method of claim 19, further comprising performing, via the client computing device, a verification on the item of personal information according to the modification before initiating the corresponding updates.

21. The method of claim 19, wherein initiating the corresponding updates further comprises logging into a plurality of network sites corresponding to at least two of the plurality of account providers.

* * * * *